US011863120B2

(12) United States Patent
Eskenazi et al.

(10) Patent No.: US 11,863,120 B2
(45) Date of Patent: Jan. 2, 2024

(54) SOLAR ARRAYS AND RELATED VEHICLES AND ASSEMBLIES

(71) Applicant: Northrop Grumman Systems Corporation, Falls Church, VA (US)

(72) Inventors: Michael I. Eskenazi, Goleta, CA (US); Michael Edward McEachen, Santa Barbara, CA (US); Christopher Peterson, Santa Barbara, CA (US)

(73) Assignee: Northrop Grumman Innovation Systems, Inc., Plymouth, MN (US)

( * ) Notice: Subject to any disclaimer, the term of this patent is extended or adjusted under 35 U.S.C. 154(b) by 0 days.

(21) Appl. No.: 17/931,068

(22) Filed: Sep. 9, 2022

(65) Prior Publication Data

US 2023/0006603 A1    Jan. 5, 2023

Related U.S. Application Data

(63) Continuation of application No. 17/121,274, filed on Dec. 14, 2020, now Pat. No. 11,444,571.

(51) Int. Cl.
*H02S 30/20* (2014.01)
*H02S 30/10* (2014.01)

(52) U.S. Cl.
CPC .............. *H02S 30/20* (2014.12); *H02S 30/10* (2014.12)

(58) Field of Classification Search
CPC ................................ H02S 30/10; H02S 30/20
See application file for complete search history.

(56) References Cited

U.S. PATENT DOCUMENTS

| 3,690,080 | A  | 9/1972  | Dillard |
| 4,747,567 | A  | 5/1988  | Johnson et al. |
| 5,520,747 | A  | 5/1996  | Marks |
| 6,423,895 | B1 | 7/2002  | Murphy et al. |
| 7,093,804 | B2 | 8/2006  | Desagulier et al. |
| 7,806,370 | B2 | 10/2010 | Beidleman et al. |

(Continued)

FOREIGN PATENT DOCUMENTS

EP    2657985 A2    10/2013

OTHER PUBLICATIONS

International Search Report for International Application No. PCT/US2021/058466, dated Feb. 2, 2022, 4 pages.

(Continued)

*Primary Examiner* — Jayne L Mershon
(74) *Attorney, Agent, or Firm* — TraskBritt

(57) ABSTRACT

A solar array may include a first rigid composite solar panel including solar cells secured to a first substrate. The solar array may further include a second rigid composite solar panel including solar cells secured to a second substrate. The solar array may also include solar panel modules including solar cells secured to a flexible sheet of material. The solar panel modules may be coupled between the first composite solar panel and the second composite solar panel. The solar array may be configured to be retained in a stowed arrangement with the solar panel modules between the first rigid composite solar panel and the second rigid composite solar panel. The solar array further configured to be extended with an extendable arm until each of the first rigid composite solar panel, the second rigid composite solar panel and the solar panel modules are arranged in a substantially straight line.

19 Claims, 18 Drawing Sheets

(56) References Cited

U.S. PATENT DOCUMENTS

| | | |
|---|---|---|
| 8,387,921 B2 | 3/2013 | Taylor et al. |
| 9,120,583 B1 | 9/2015 | Spence et al. |
| 10,119,292 B1 | 11/2018 | Harvey et al. |
| 2008/0276984 A1 | 11/2008 | Gumm |
| 2011/0210209 A1 | 9/2011 | Taylor et al. |
| 2012/0012154 A1* | 1/2012 | Keller .................. B64G 1/443 |
| | | 52/645 |
| 2021/0193854 A1 | 6/2021 | Stutterheim et al. |
| 2021/0320619 A1* | 10/2021 | Rehder .................. H02S 30/10 |

OTHER PUBLICATIONS

International Written Opinion for International Application No. PCT/US2021/058466, dated Feb. 2, 2022, 7 pages.

\* cited by examiner

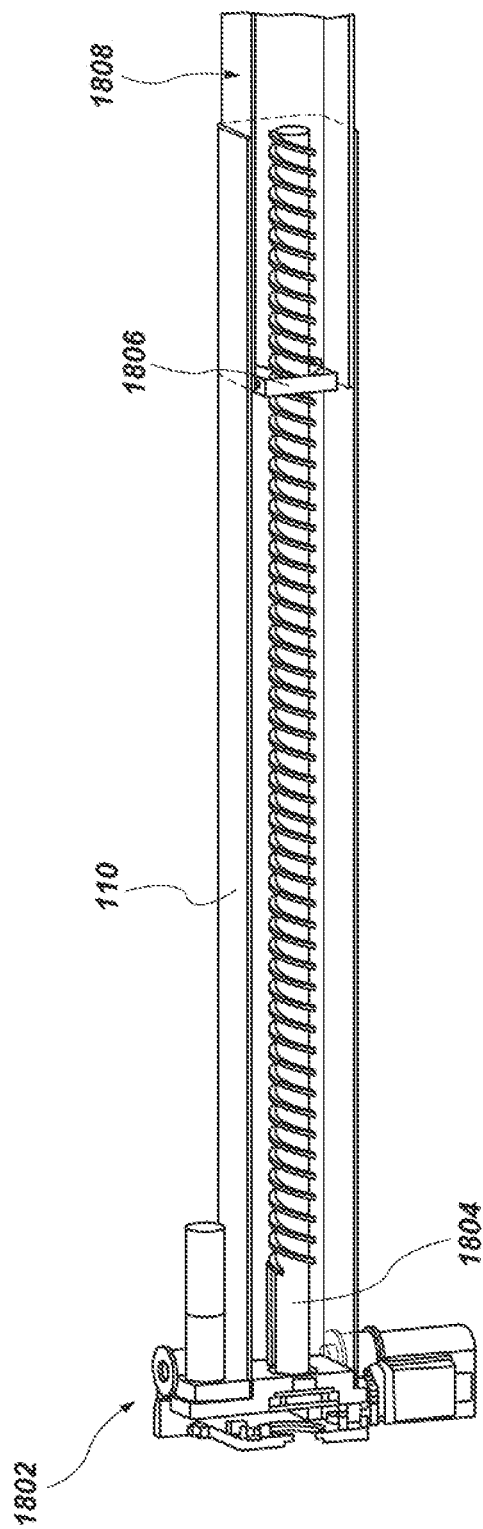

SOLAR ARRAYS AND RELATED VEHICLES AND ASSEMBLIES

CROSS-REFERENCE TO RELATED APPLICATION

This application is a continuation of U.S. patent application Ser. No. 17/121,274, filed Dec. 14, 2020, now U.S. Pat. No. 11,444,571, issued Sep. 13, 2022, the disclosure of which is hereby incorporated herein in its entirety by this reference.

TECHNICAL FIELD

Embodiments of the present disclosure generally relate to solar arrays. In particular, embodiments of the present disclosure relate to space solar arrays, space solar array assemblies, and related methods of assembly and deployment of space solar arrays.

BACKGROUND

Equipment deployed in space, such as satellites, manned spacecraft, pods, etc., may utilize power generated by solar arrays to power computers, control systems, communication systems, etc. The solar arrays may be stowed during launch and/or deployment of the equipment. For example, the solar arrays may be folded in an accordion-like fashion against or within the associated equipment. When the solar arrays are fully deployed the solar panels may be oriented in substantially a common plane. The solar array may include multiple panels supporting solar cells for generating electrical power.

BRIEF SUMMARY

Some embodiments of the present disclosure may include a solar array. The solar array may include a first rigid composite solar panel including solar cells secured to a first rigid substrate. The solar array may further include a second rigid composite solar panel including solar cells secured to a second rigid substrate. The solar array may also include at least one flexible solar panel module including solar cells secured to a flexible sheet of material. The at least one flexible solar panel module may be coupled between the first rigid composite solar panel and the second rigid composite solar panel.

Another embodiment of the present disclosure may include a method of extending a solar array. The method may include releasing a stowed solar array assembly. The solar array assembly may include a first composite solar panel, a second composite solar panel, multiple solar panel modules, and an arm. The method may further include rotating the solar array assembly about a first hinge coupled between the arm and a vehicle body. The arm may be coupled to the first composite solar panel. The method may further include rotating the second composite solar panel and the multiple solar panel modules in an opposite direction about a second hinge coupled between the second composite solar panel and the arm. The method may also include extending the arm until each of the multiple solar panel modules are arranged in a substantially straight line. Each of the multiple solar panel modules may be coupled to adjacent solar panel modules by a hinged connection and the multiple solar panel modules may be coupled between the first composite solar panel and the second composite solar panel by one or more cables.

Another embodiment of the present disclosure may include a solar panel assembly. The solar panel assembly may include a first rigid solar panel including a first arrangement of solar cells coupled to a first rigid substrate. The solar panel assembly may further include a second rigid solar panel including a second arrangement of solar cells coupled to a second rigid substrate. The solar panel assembly may also include multiple solar panel modules including a third arrangement of solar cells coupled to a flexible sheet. The multiple solar panel modules may be coupled to adjacent solar panel modules through hinged connections. A first solar panel module of the multiple solar panel modules may be coupled to the first rigid solar panel through a cable. A second solar panel module of the multiple solar panel modules coupled to the second rigid solar panel through the cable. The solar panel assembly may be configured to be retained in a stowed position wherein each of the multiple solar panel modules is arranged in a front-to-front or back-to-back arrangement with the adjacent solar panel modules through the hinged connection.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

FIG. 18 illustrates a cross-sectional view of an extendable mast of the solar array of FIGS. 1, 7, 8, and 9 in accordance with an embodiment of present disclosure.

DETAILED DESCRIPTION

The illustrations presented herein are not meant to be actual views of any particular solar array or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met. In another example, a substantially straight line may be a line wherein an angle between individual segments of the line vary from 180° by less than about 10°, such as less than about 5° or even less than about 1°.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Solar arrays may be formed from multiple composite solar panels. The size of the solar array may be limited by the volume (e.g., thickness or height) required for the multiple composite solar panels, when in the stowed position. For example, a typical composite solar panel may have a thickness of between about 1 centimeters (cm) and about 2 cm. Moreover, when in a stowed or folded position adjacent composite solar panels may require an additional 0.5 cm to about 1 cm of space between the adjacent composite solar panels.

The solar array may be deployed on equipment for use in space. The equipment may be transported to space on a vehicle configured to travel from the surface of the earth to space, such as a rocket or other spacecraft. The vehicle may have significant limitations on available payload volume and weight. The volume and weight restrictions may limit the size of the equipment or accessories that may be included with the equipment. Thus, reducing the volume, and specifically the height required by the solar arrays in a stowed position may allow additional accessories to be included on the equipment. The size of the equipment may also be able to increase if the volume required by the solar arrays in the stowed position is decreased. In other cases, reducing the volume and/or weight required for the solar arrays in the stowed position may allow additional equipment to be transported in the same vehicle.

Figure 1:
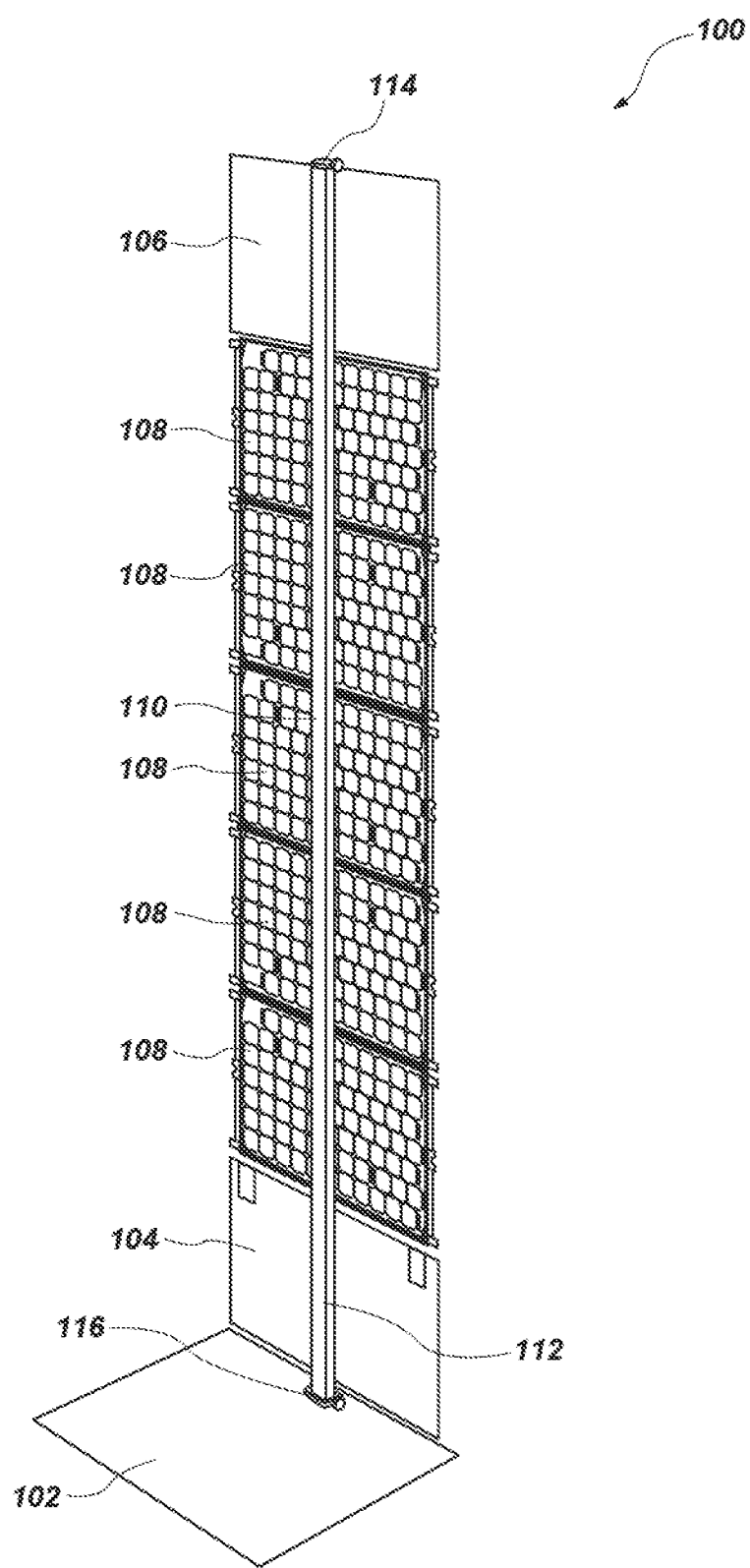
FIG. 1 illustrates a perspective view of a solar array in accordance with an embodiment of the present disclosure.

FIG. 1 illustrates a solar array 100 extending from a body 102 of a piece of equipment, such as a space craft, a satellite, etc. The solar array 100 may include a base composite panel 104, a top composite panel 106, and multiple panel modules 108 extending between the base composite panel 104 and the top composite panel 106. The panel modules 108 may be substantially thinner and lighter than the base composite panel 104 and the top composite panel 106, as described in more detail below in the description FIG. 3. The panel modules 108 may each have a surface area that is substantially the same as at least one of the base composite panel 104 or the top composite panel 106. Thus, the solar array 100 may have an active surface area substantially the same as if each of the panel modules 108 were also composite panels; however, the assembly may weigh much less than a similar sized solar array entirely formed from composite solar panels.

The base composite panel 104 and the top composite panel 106 may be coupled to opposite ends of a mast 110 (e.g., boom, arm, etc.). For example, the base composite panel 104 may be coupled to the mast 110 with a bracket 112. In some embodiments, the bracket 112 may be part of the mast 110. For example, the bracket 112 may be one or more flanges extending laterally from the sides of the mast 110. In some embodiments, the bracket 112 may be an additional element configured to interface with the mast 110. For example, the bracket 112 may extend over the mast 110 with connection points extending on either end to interface with the base composite panel 104. In other embodiments, the bracket 112 and the mast 110 may include complementary geometry configured to interlock coupling the mast 110 to the bracket 112. The bracket 112 may be coupled to the base composite panel 104 through a hardware connection (e.g., screws, bolts, rivets, studs, nuts, etc.) or an adhesive connection (e.g., epoxy, glue, tape, etc.).

The top composite panel 106 may be coupled to a distal end of the mast 110 with a movable connection, such as a top hinge 114. The top hinge 114 may couple the distal end of the mast 110 to a top edge of the top composite panel 106. As described in further detail below with reference to FIGS. 16A-16D, the top hinge 114 may allow the top composite panel 106 to rotate relative to the distal end of the mast 110 as the solar array 100 extends from the body 102.

The mast 110 may be coupled to the body 102 through another moveable connection between a proximal end of the mast 110 and the body 102. The movable connection may be a root hinge 116. As described in further detail below with reference to FIGS. 17A and 17B, the root hinge 116 may allow the mast 110 and the solar array 100, through its connection to the mast 110, to rotate relative to the body 102 when the solar array 100 is being deployed. The root hinge 116 may also be configured to latch the mast 110 and the solar array 100 in position once the solar array 100 is deployed.

Figure 2:
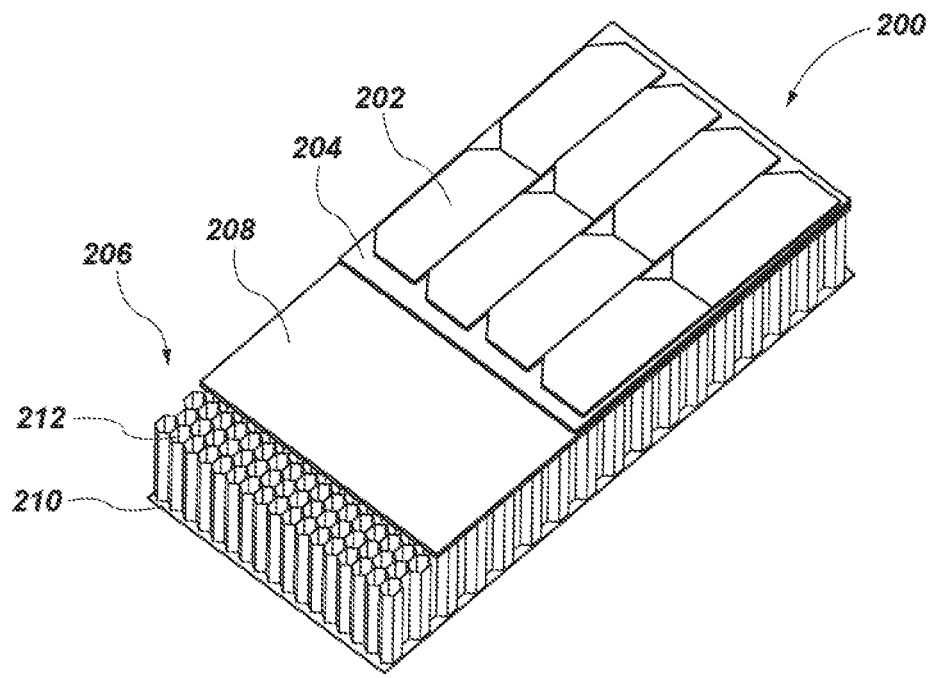
FIG. 2 illustrates a sectioned perspective view of a composite solar panel in accordance with an embodiment of the present disclosure.

FIG. 2 illustrates a composite solar panel 200, such as the base composite panel 104 or the top composite panel 106. The composite solar panel 200 may include multiple solar cells 202 arranged on a surface of the composite solar panel 200. The solar cells 202 may be coupled to the composite solar panel 200 with an adhesive layer 204. The adhesive layer 204 may couple the solar cells 202 to a substrate 206. The substrate 206 may include a top film 208, commonly referred to as a facesheet, and a bottom film 210 sandwiching a core 212. The top film 208 may include an electrically insulating coating or film, such as KAPTON® configured to substantially prevent electrical connections between the solar cells 202 through the top film 208. The sandwich construction may improve strength and stiffness characteristics of the substrate 206. For example, the core 212 may be formed from a flexible honeycomb structured material, such as aluminum honeycomb and the top film 208 and the bottom film 210 may be formed from a thin material having a relatively high tensile strength and stiffness, such as a graphite. Spacing the top film 208 and the bottom film 210 with the core 212 may increase a bending resistance of the substrate 206, increasing the rigidity of the substrate 206. The increased rigidity may allow the substrate 206 to substantially protect the solar cells 202 from damage due to bending. In some embodiments, the substrate 206 may include multiple sandwich layers. For example, the substrate 206 may include two layers of core 212 having the top film 208 above the first layer of core 212 and the bottom film 210 below the second layer of core 212 and an additional intermediate film layer between the first layer of core 212 and the second layer of core 212.

The substrate 206 may allow additional structural elements, such as hinges, latches, tensioners, etc., to be mounted to the composite solar panel 200. For example, some areas of the composite solar panel 200 may be free from solar cells 202. These areas may include holes passing through the substrate 206 sized and configured to receive hardware connections, electrical devices, electrical connectors or wiring, etc. In some embodiments, the additional structural elements may be coupled to the substrate 206 with an adhesive (e.g., epoxy, glue, etc.).

As described above, the composite solar panel 200 may have a thickness of between about 1 cm and about 2 cm. The majority of the thickness of the composite solar panel 200 may result from the thickness of the substrate 206.

Figure 3:
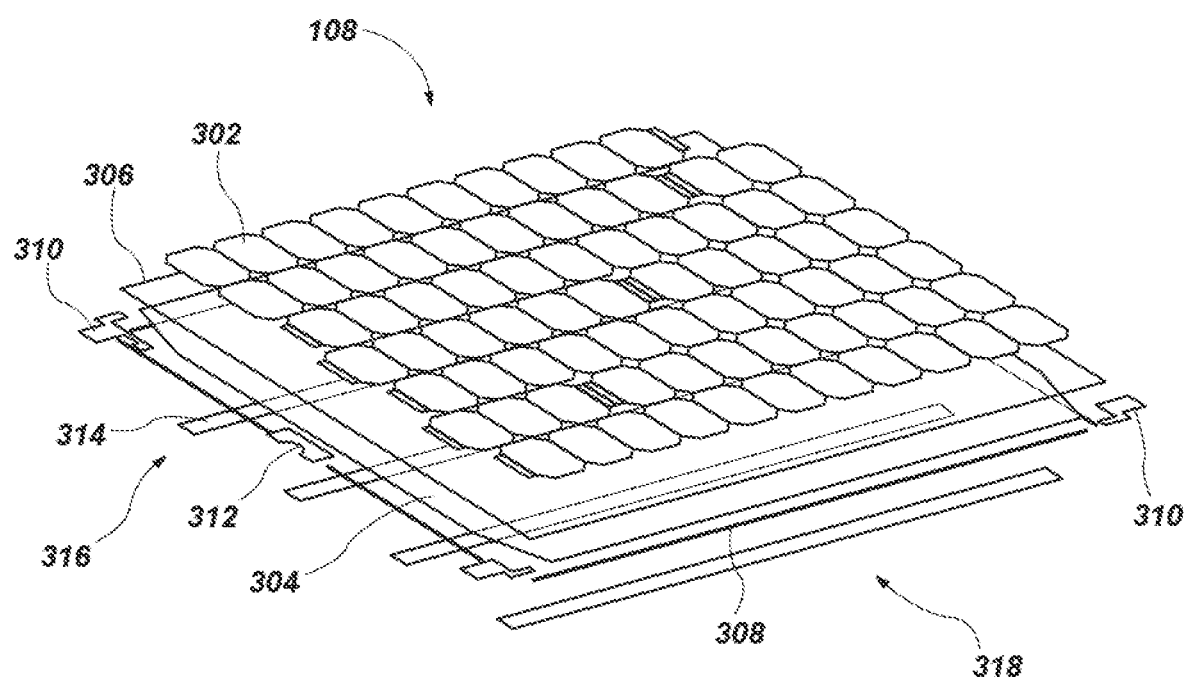
FIG. 3 illustrates an exploded view of a solar panel module in accordance with an embodiment of the present disclosure.

FIG. 3 illustrates an exploded view of a panel module 108. The panel module 108 may be much thinner than the composite solar panel 200. For example, the panel module 108 may not include a substrate 206 or similar structure. Thus the panel module 108 may be relatively flexible (e.g., not rigid). The panel module 108 may include multiple solar cells 302 secured to a flexible cell support 304. The cell support 304 may be a thin sheet of material, such as an open weave scrim material. The cell support 304 may be formed from synthetic fiber materials, such as VECTRAN®, or KEVLAR® or fiber glass. The material of the cell support 304 may be stretched flat by a front frame 306 and a rear frame 308. The front frame 306 and the rear frame 308 may substantially surround the cell support 304 and sandwich the cell support 304 between the front frame 306 and the rear frame 308, such that the cell support 304 may remain substantially planar as defined by the front frame 306 and/or the rear frame 308.

The front frame 306 and the rear frame 308 may be formed from thin strips of material, such as a graphite or an epoxy configured to provide structural support to the solar cells 302 and the cell support 304. The thin strips of material may have a width that is greater than a thickness of the thin strips of material. For example, the thin strips may have a width of between about 0.10 inches (in) (2.54 millimeters (mm)) and about 0.20 in (5.08 mm), such as between about 0.15 in (3.81 mm) and about 0.19 in (4.83 mm) or about 0.18 in (4.57 mm). The thin strips may have a thickness of between about 0.020 in (0.508 mm) and about 0.030 in (0.762 mm), such as between about 0.022 in (0.559 mm) and about 0.026 in (0.660 mm) or about 0.024 in (0.610 mm). The greater width may allow the thin strips to provide greater strength in an outward direction to maintain the tension in the cell support 304, while maintaining a relatively thin profile for the panel module 108.

The thin strips of material may be coupled to one another to form the front frame 306 and rear frame 308 through multiple corner supports 310. The corner supports 310 may be configured to form a substantially rectangular frame by joining the thin strips of material at substantially 90° angles. In some embodiments, the corner supports 310 may further allow the panel modules 108 to be connected to one another and may place the majority of the loads (e.g., stress, tension, impact, etc.) in the thin strips of material forming the front frame 306 and the rear frame 308 rather than in the cell support 304 or the solar cells 302. For example, the corner supports 310 may have a substantially complementary geometry with one another, such that each corner support 310 may be joined with an adjacent corner support 310 to form a hinged connection.

In some embodiments, one or more sides of the front frame 306 and/or the rear frame 308 may be formed from a cable (e.g., lanyard, string, fiber, etc.). For example, lateral sides 316 of at least one of the front frame 306 or the rear frame 308 may be formed from a cable, such as a glass fiber lanyard, carbon fiber lanyard, graphite lanyard, etc. The lateral sides 316 may be the sides of the panel module 108 substantially aligned with the extension direction of the solar array 100. For example, the lateral side 316 may be substantially perpendicular to the joint side 318, which may be the side of the panel module 108 configured to abut against a joint side 318 of a proximate panel module 108 or to the base composite panel 104 or top composite panel 106. As described in further detail below with respect to FIG. 4, the cable may form a substantially continuous cable connection between the base composite panel 104 and the top composite panel 106 passing along the lateral sides 316 of each of the intervening panel modules 108 and coupled to each of the corner supports 310.

The front frame 306 and/or rear frame 308 may further include a wire support 312 on at least two sides of the panel module 108. The wire support 312 may be configured to position wires (e.g., electrical wiring, control wiring, transmission wiring, etc.) along the lateral sides 316 of the front frame 306 and the rear frame 308. The wire support 312 may be positioned in a central portion of the thin strips of material forming the respective sides of the panel module 108. In some embodiments, the wire support 312 may be positioned on the lateral side 316 of the panel module 108.

The portions of the front frame 306 and the rear frame 308 in the lateral sides 316 may be configured to bear the tension loads exerted on the panel module 108. The tension loads may be configured to maintain the base composite panel 104, top composite panel 106, and the panel modules 108 of the solar array 100 in substantially the same plane.

The panel module 108 may include multiple cushion strips 314 arranged on a rear side of the panel module 108 (e.g., a side of the panel module 108 opposite the solar cells 302). The cushion strips 314 may be configured to allow the panel module 108, while in a stowed position, to rest on an adjacent panel module 108 without damaging the adjacent panel module 108 while reducing a distance between the panel modules 108 to substantially a thickness of the cushion strips 314. The cushion strips 314 may have a thickness of between about 0.020 in (0.508 mm) and about 0.030 in (0.762 mm), such as between about 0.022 in (0.559 mm) and about 0.026 in (0.660 mm) or about 0.024 in (0.610 mm). In some embodiments, the cushion strips 314 may be formed from a resilient material, such as a foam, a rubber or other elastomer material, a polymer etc. The cushion strips 314 may be coupled to the cell support 304 with an adhesive, such as a tape (e.g., polymide adhesive tape, KAPTON®, etc.), an epoxy, glue, etc.

The cushion strips 314 may be arranged on the panel module 108 such that the cushion strips 314 are parallel to and offset from the cushion strips 314 on the adjacent panel module 108. Arranging the cushion strips 314 to be parallel and offset from the adjoining cushion strips 314 may allow the panel modules 108 to rest against one another with a cushioned contact area substantially equal to twice that of the cushion strips 314 of each individual panel module 108 because the cushion strips 314 of each of the individual panel modules 108 may contact surfaces of an adjacent panel module 108. Furthermore, as the cushion strips 314 of the adjacent panel modules 108 may not contact cushion strips 314 on the opposing panel modules 108 the standoff between the adjacent panel modules 108 when stowed is minimized.

Figure 4:
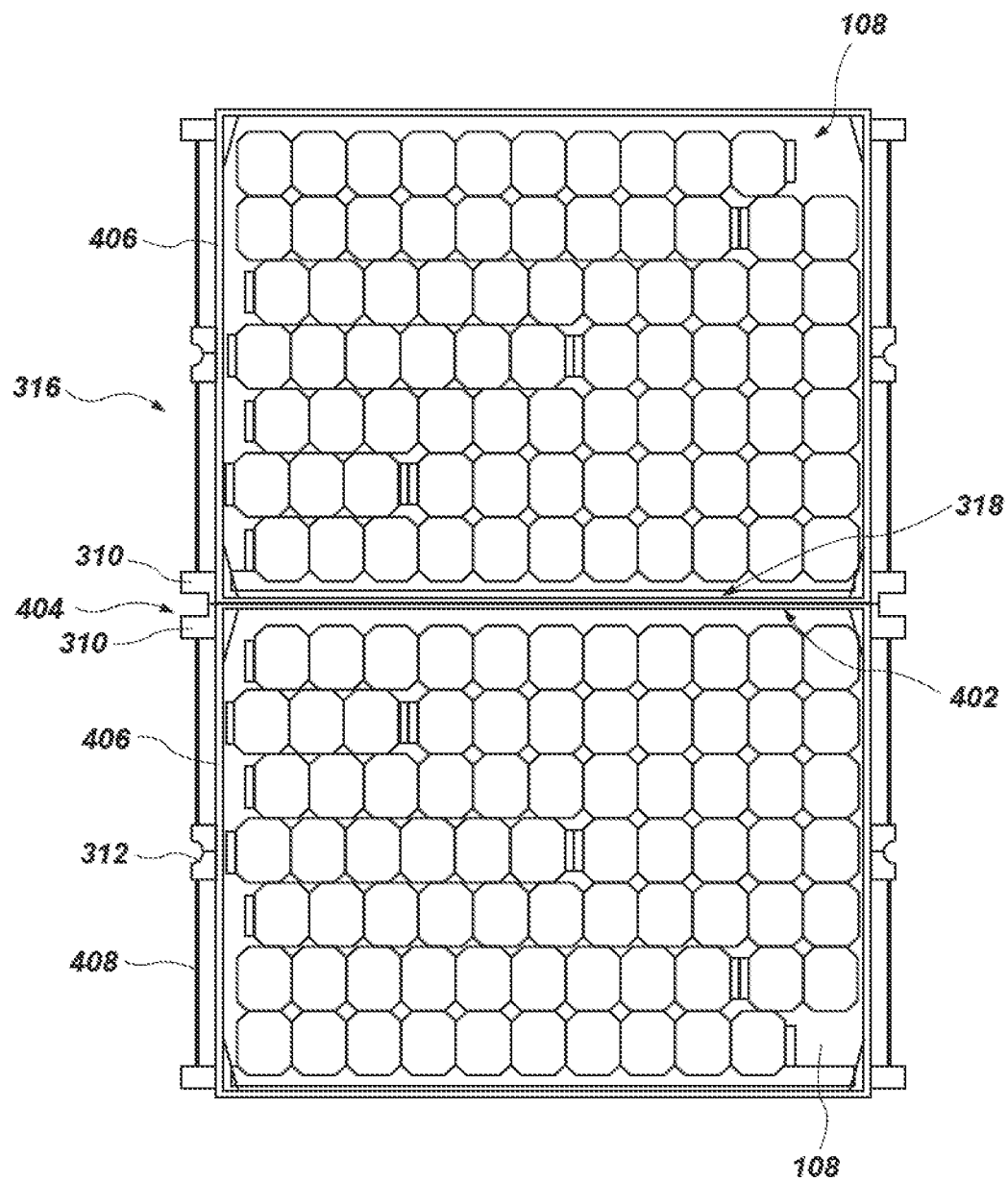
FIG. 4 illustrates a plan view an assembly of two of the solar panel modules of FIG. 3 in accordance with an embodiment of the present disclosure.

FIG. 4 illustrates two panel modules 108 joined together at a joint 402. The joint 402 may be formed along the joint sides 318 of the two adjacent panel modules 108. The panel modules 108 may be joined together at the joint 402 with hinges 404 formed from an interface between the respective corner supports 310. For example, as described above, the corner supports 310 may include complementary geometry along the joint sides 318 of the respective panel modules 108 configured to form a hinged connection between the adjoining corner supports 310 and therefore the adjoining joint sides 318 of the respective panel modules 108. The hinges 404 may allow the panel modules 108 to rotate relative to one another about an axis defined along the joint 402. The hinges 404 may also restrict translational movement between the adjacent panel modules 108 in both a direction along the axis defined by the joint 402 and a direction transverse to the axis defined by the joint 402.

A cable 406 may be coupled between the corner supports 310 of each panel module 108 and the wire support 312 on each lateral side 316 of each panel module 108. In some embodiments, the cable 406 may form a side of one or more of the front frame 306 or the rear frame 308 as described above. In some embodiments, the cable 406 may be distinct from the front frame 306 and the rear frame 308. For example, the cable 406 may be configured to provide additional support along the lateral sides 316 of the panel modules 108. In some embodiments, the cable 406 may have similar geometry to the thin strips of material used to form the front frame 306 and the rear frame 308.

Tension in the cable 406 may be transmitted between the adjacent panel modules 108 through the hinges 404 such that the connections between the cable 406, and the corner supports 310 may form a substantially constant tension member along the length of the joined panel modules 108. In some embodiments, the cable 406 may pass through the hinges 404 such that the cable 406 is substantially constant between the base composite panel 104 and the top composite panel 106 forming the tension member without the hinges 404.

Electrical wiring 408 for carrying solar cell power, signals, and/or control data, such as telemetry, temperature, etc., to the spacecraft may run along the lateral sides 316 of the panel modules 108. The wiring 408 may be secured to the wire support 312 and to the corner supports 310. For example, the corner supports 310 and the wire support 312 may be configured to protect the wiring 408 at interface points between the panel modules 108 and other components of the solar array 100. In some embodiments, the corner supports 310 and/or the wire support 312 may be positioned at wiring interfaces of the respective panel module 108, such that the wiring 408 may form electrical connections with the panel module 108 at points adjacent to the corner supports 310 and/or the wire support 312. In some embodiments, the corner supports 310 and/or the wire support 312 may be configured to substantially protect the connection point from damage, such as fatigue damage, damage from movement, damage from impacts, etc.

Figure 5:
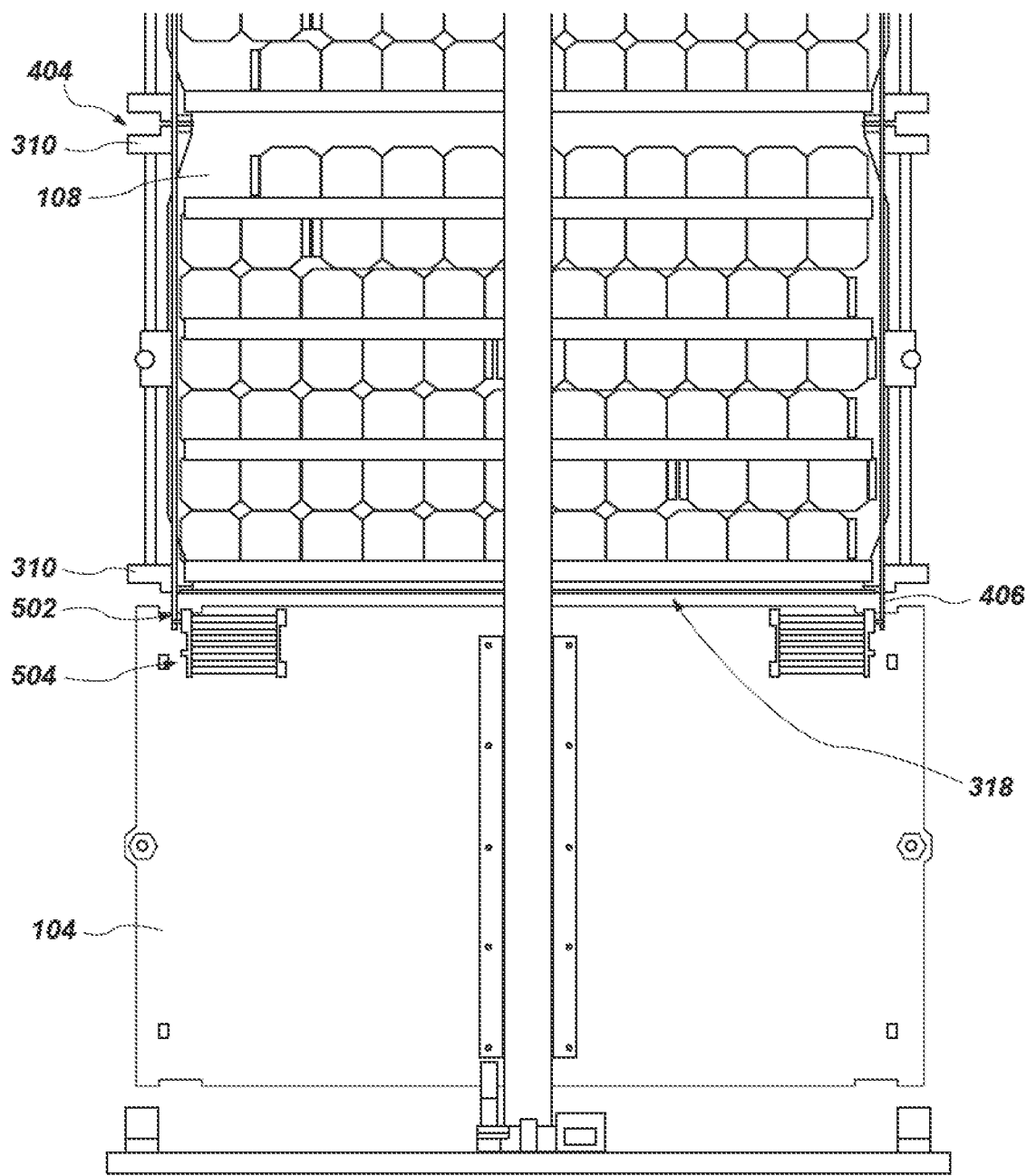
FIG. 5 illustrates a plan view of a connection between a composite solar panel and a solar panel module in accordance with an embodiment of the present disclosure.

FIG. 5 illustrates the connection point between the base composite panel 104 and the first panel module 108. The base composite panel 104 may connect to the first panel module 108 through a base connection 502. The base connection 502 may be coupled to the corner support 310 adjacent to the base composite panel 104. The base connection 502 may be configured to form a hinged connection between the base composite panel 104 and the first panel module 108. For example, the base connection 502 may allow the panel module 108 to rotate relative to the base composite panel 104 about an axis defined substantially along the joint side 318 of the panel module 108 adjacent to the base composite panel 104.

The base connection 502 may include a preload assembly 504 configured to maintain tension through the tension member formed by the cable 406 or the cable 406 and the corner supports 310. For example, when deployed in space the solar array 100 may experience significant changes in temperature. Such significant changes in temperature may change the tension in the tension member as the components of the tension member expand and/or contract in response to the temperature changes. As the components expand or contract the tension may require adjustment to maintain the base composite panel 104, top composite panel 106, and the intervening panel modules 108 in substantially the same plane.

Figure 6A:
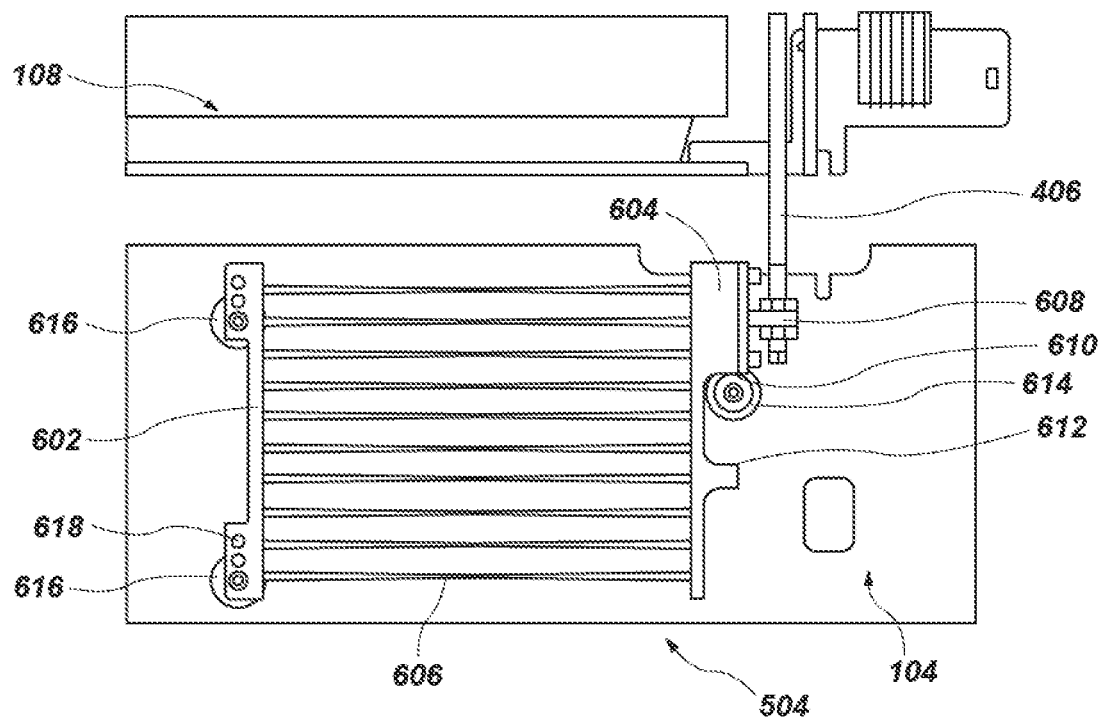
FIGS. 6A and 6B illustrate plan views of a preload assembly of the connection between the composite solar panel and the solar panel module of FIG. 5 in an unloaded and a loaded position.
Figure 6B:
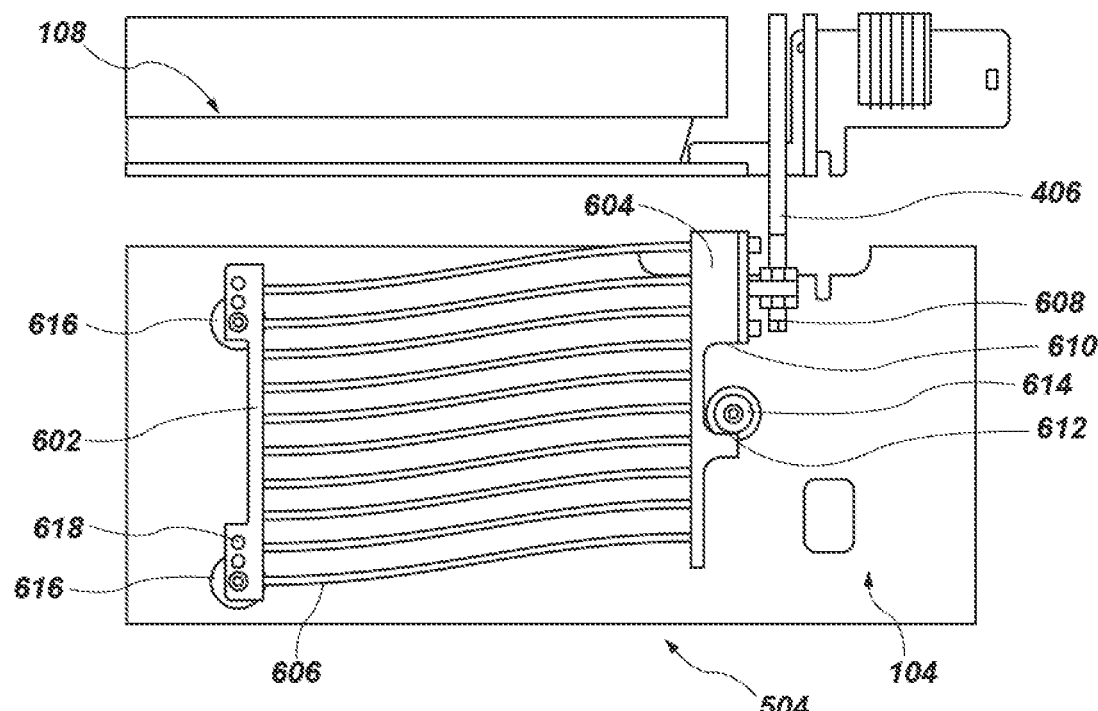
Figure 7:
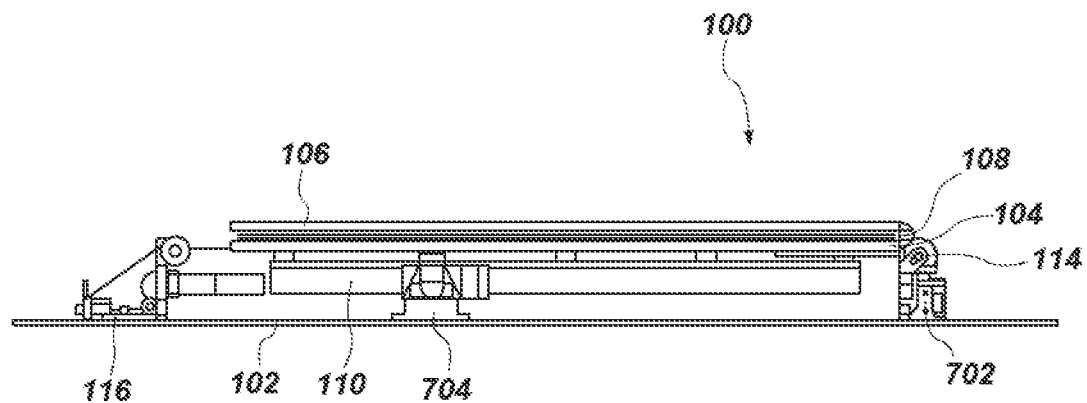
FIG. 7 illustrates a side view of the solar array of FIG. 1 in a stowed position in accordance with an embodiment of the present disclosure.
Figure 8:
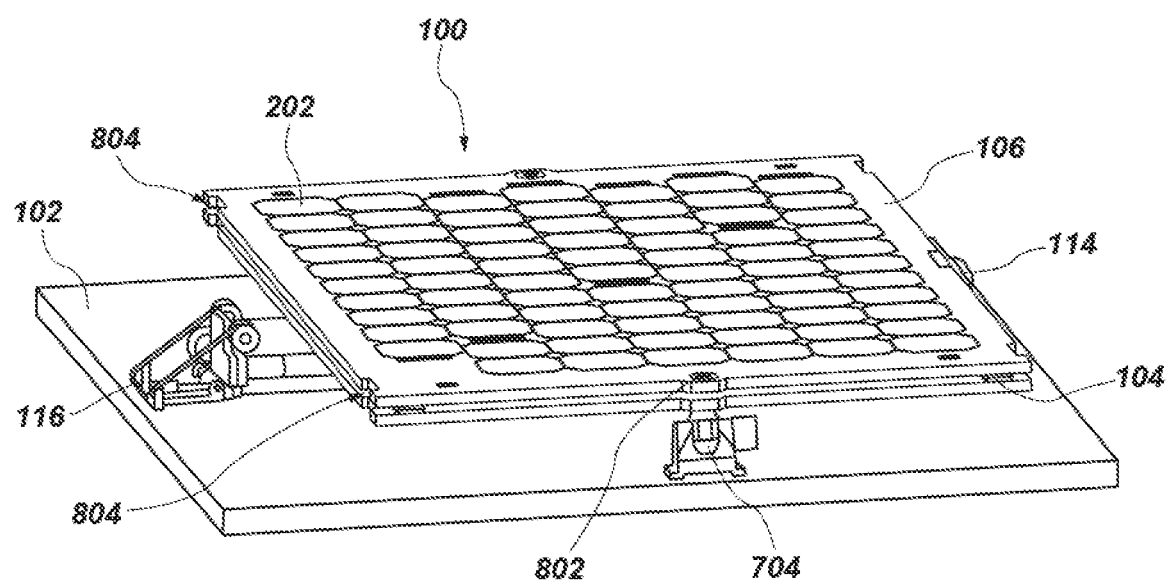
FIG. 8 illustrates a perspective view of the solar array of FIGS. 1 and 7 in a stowed position in accordance with an embodiment of the present disclosure.
Figure 9:
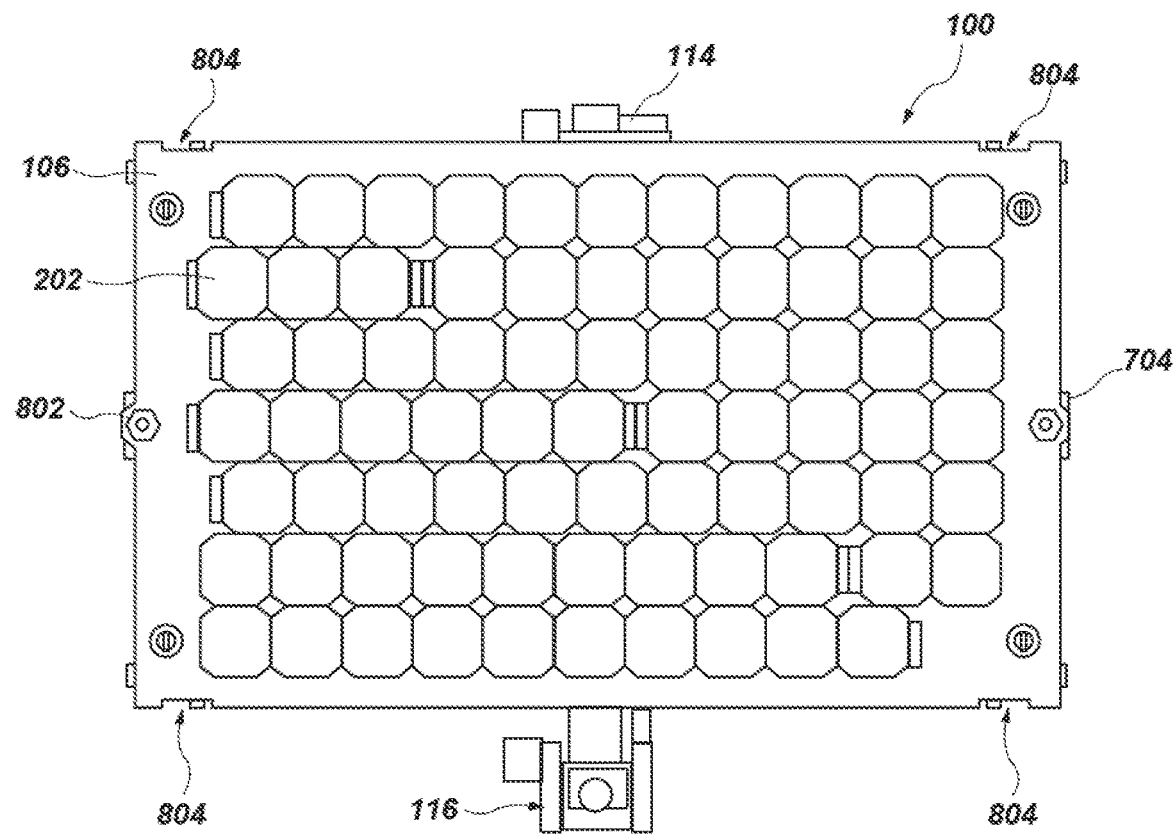
FIG. 9 illustrates a top view of the solar array of FIGS. 1, 7, and 8 in the stowed position in accordance with an embodiment of the present disclosure.

FIGS. 6A and 6B illustrate enlarged views of the preload assembly 504 in two different positions. FIG. 6A illustrates the preload assembly 504 in an unloaded (e.g., no pre-load, resting, etc.) position. The preload assembly 504 may include a stationary flange 602 and a moving flange 604 coupled together by multiple tensioner elements 606. The cable 406 may be coupled to the moving flange 604 through a cable connection 608. The moving flange 604 may be configured to translate relative to the stationary flange 602. The translation of the moving flange 604 may be limited by a top detent 610 and a bottom detent 612. For example, the base composite panel 104 may include a stop 614 configured to interface with the top detent 610 and/or the bottom detent 612 substantially preventing the moving flange 604 from translating a distance greater than the distance between the top detent 610 and the bottom detent 612. In some embodiments, the stop 614 may include a substantially round surface configured to allow the moving flange 604 to freely move against the stop 614 until the stop 614 encounters the top detent 610 or the bottom detent 612. For example, the stop 614 may include a roller, such as a wheel or a bearing.

The stationary flange 602 may remain substantially stationary relative to the base composite panel 104. The stationary flange 602 may be secured to the base composite panel 104 through one or more anchors 616. The anchors 616 may be a hardware connection, such as a pin, screw, clamp, stud, etc. The anchors 616 may be configured to maintain the stationary flange 602 in substantially a same position, such that movement of the stationary flange 602 in any direction is substantially prevented.

The tensioner elements 606 may be configured to restrict movement of the moving flange 604 relative to the stationary flange 602. For example, the tensioner elements 606 may act as a biasing element biasing the moving flange 604 towards a resting position as illustrated in FIG. 6A.

FIG. 6B illustrates the preload assembly 504 in a loaded position. In the loaded position the moving flange 604 may be translated relative to the stationary flange 602 such that the tensioner elements 606 are applying a load (e.g., preload, biasing load) on the moving flange 604, effectively biasing the moving flange 604 in a direction away from the panel modules 108. The tensioner elements 606 may be configured to increase the load as the moving flange 604 moves away from the resting position and decrease the load as the moving flange 604 moves toward the resting position. Changing the load may effectively maintain the tension in the cable 406 as the components of the solar array 100 expand and contract due to changing thermal conditions in space.

The stationary flange 602 may include multiple adjustment apertures 618 configured to adjust the magnitude of the preload on the cable 406. For example, the adjustment apertures 618 may allow the position of the stationary flange 602 to be changed by moving the location where the anchors 616 are coupled to the stationary flange 602. Moving the position of the stationary flange 602 may move the resting position of the preload assembly 504. As described above, the load exerted by the tensioner elements 606 may be proportional to the distance of the moving flange 604 from the resting position. Thus, moving the resting position away from the panel module 108 may increase the preload exerted on the cable 406 by the preload assembly 504 and moving the resting position toward the panel module 108 may decrease the preload exerted on the cable 406 by the preload assembly 504.

FIGS. 7-10 illustrate the solar array 100 in a stowed configuration. In the stowed configuration each of the base composite panel 104, top composite panel 106, and the panel modules 108 may be positioned such that the base composite panel 104, top composite panel 106, and panel modules 108 are substantially mutually parallel and substantially parallel to the plane of the body 102. For example, the mast 110 may be positioned in a direction substantially parallel to the plane of the body 102. As described in further detail below, the mast 110 may be configured to extend and retract, such that in the stowed configuration the mast 110 may be substantially the same length as the base composite panel 104 and/or the top composite panel 106. The mast 110 may be positioned between the base composite panel 104 and the body 102.

The mast 110 may be coupled to the body 102 by the root hinge 116. The connection between the root hinge 116 and the mast 110 may effectively couple the solar array 100 to the body 102. In the stowed configuration, the root hinge 116 may be configured to secure at least one end of the solar array 100 through the connection to the mast 110. The body 102 may further include side latches 704 and a top latch 702. The side latches 704 may be configured to secure the sides of the solar array 100 to the body 102 in the stowed configuration and the top latch 702 may be configured to secure an end of the solar array 100 opposite the root hinge 116 to the body 102.

The combination of the root hinge 116, the side latches 704, and the top latch 702 may position the base composite panel 104, top composite panel 106, and the panel modules 108 in a substantially parallel orientation relative to the body 102. The base composite panel 104 may be the lowermost panel (e.g., closest panel to the body 102). A void may be defined between the body 102 and the base composite panel 104 in the stowed position. For example, the void may be at least sufficient to allow the mast 110 to be positioned between the base composite panel 104 and the body 102. The connections between the side latches 704, top latch 702, and the root hinge 116 may be configured to secure the solar array 100 during high stress and/or high load conditions, such as launch, loading, etc. The side latches 704, top latch 702, and root hinge 116 combined with the substantially rigid base composite panel 104 and top composite panel 106 may secure and protect the panel modules 108 during the high stress and/or high load conditions. The rigidity of the base composite panel 104 and the top composite panel 106 may substantially prevent damage to the solar cells 302 of the panel modules 108 when in the stowed position.

In the stowed position the top composite panel 106 may be positioned such that the solar cells 202 are directed (e.g., facing) outward away from the body 102. This may allow the solar array 100 to generate power even when in the stowed position. Power generated when in the stowed position may charge batteries, power controllers, and/or power components of the equipment such as to extend the solar array 100, etc.

The top composite panel 106 may include latch receivers 802 configured to receive the side latches 704. The side latches 704 may be configured to pass through the base composite panel 104 and secure the top composite panel 106 through the latch receivers 802, such that the panel modules 108 are sandwiched between the base composite panel 104 and the top composite panel 106. In some embodiments, the base composite panel 104 may include a latch receiver configured to receive a portion of an associated side latch 704. For example, the side latch 704 may be configured to position the base composite panel 104 and the top composite panel 106 relative to the body 102 and relative to one another. In some embodiments, the side latch 704 may be configured to independently release the top composite panel 106 and the base composite panel 104, such that one of the top composite panel 106 and the base composite panel 104 may be released before the other base composite panel 104 or top composite panel 106 is released.

In the stowed configuration the solar array 100 may include connection assemblies 804 on opposing corners of the solar array 100. The connection assemblies 804 may be positioned in substantially the same position as the hinges between the base composite panel 104, the panel modules 108, and the top composite panel 106. Thus, the connection assemblies 804 may be positioned on the ends of the solar array 100 that are parallel with the joint sides 318 of the panel modules 108. The joint sides 318 of the panel modules 108 may be on the same sides of the solar array 100 as the top hinge 114 and/or the root hinge 116.

Figure 10:
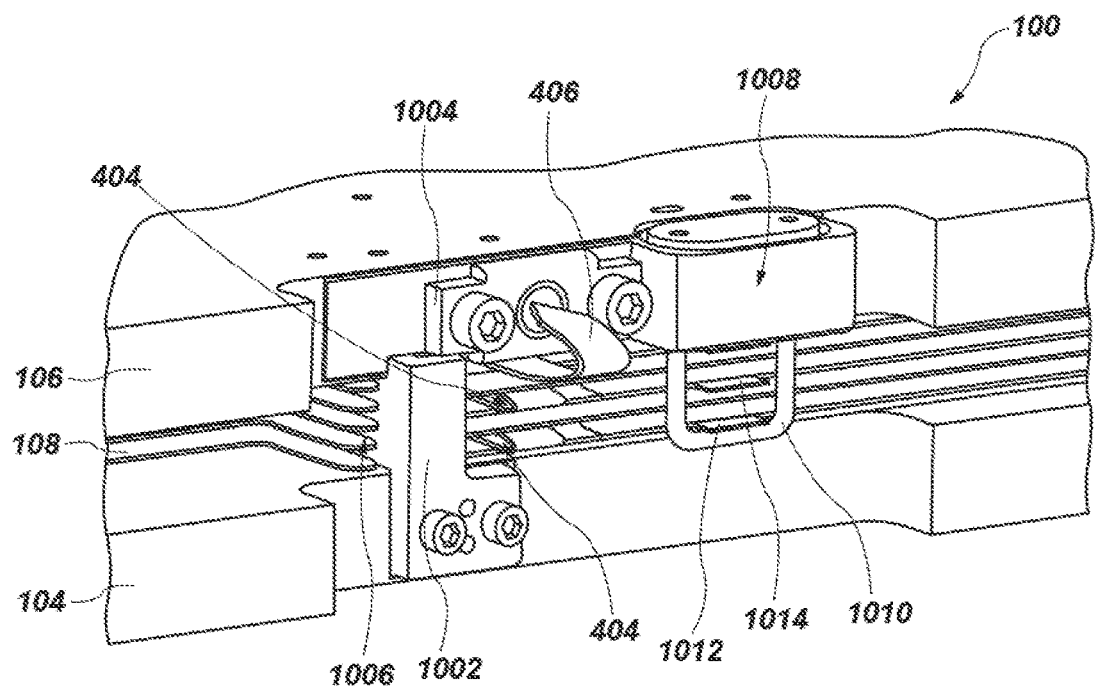
FIG. 10 illustrates an enlarged view of a connection assembly of the solar array of FIGS. 1, 7, 8, and 9 in the stowed position in accordance with an embodiment of the present disclosure.

FIG. 10 illustrates an enlarged view of a connection assembly 804. The connection assembly 804 may include a stop 1002 and a stop plate 1004. The stop 1002 and the stop plate 1004 may be configured to maintain a separation between the base composite panel 104 and the top composite panel 106. For example, the separation may be configured to allow the panel modules 108 to be folded between the base composite panel 104 and the top composite panel 106. The stop 1002 may include fingers 1006 configured to extend from the stop 1002 into the space defined between the base composite panel 104 and the top composite panel 106. For example, the fingers 1006 may be configured to extend between each of the adjacent panel modules 108, securing each of the panel modules 108 relative to the base composite panel 104 and the top composite panel 106. The fingers 1006 may substantially prevent movement of the panel modules 108 relative to one another in the stowed position. Preventing movement of the panel modules 108 may substantially prevent damage due to impacts, and/or vibrations during high stress and/or high load conditions.

As illustrated in FIG. 10, the cable 406 may follow the panel modules 108 through the hinged points between the panel modules 108. For example, the cable 406 may bend around the hinges 404 between adjacent panel modules 108. The panel modules 108 may be folded in a "Z" pattern between the base composite panel 104 and the top composite panel 106 such that the hinges between adjacent panel modules 108 are on opposing ends of the solar array 100. The "Z" pattern may cause the panel modules 108 to be arranged in a front-to-front or back-to-back arrangement with adjacent panel modules 108. The cable 406 may enter the top composite panel 106 through the stop plate 1004. The cable 406 may enter the base composite panel 104 on an opposite end of the solar array 100.

The top composite panel 106 may include a panel module clip 1008 extending from the top composite panel 106 and configured to secure the panel modules 108 to the top composite panel 106 in the stowed position. The panel module clip 1008 may include a latch bar 1010. The latch bar 1010 may be configured to interface with a bottom strike 1012 extending from a hinge 404 between two panel modules 108. For example, the bottom strike 1012 may extend from the lowermost hinge 404 in the stack of panel modules 108 of the solar array 100 in the stowed position. The bottom strike 1012 may be configured to release from the latch bar 1010 when the lowermost panel module 108 begins to form an angle with the top composite panel 106 moving a position or orientation of the bottom strike 1012. The stack of panel modules 108 may further include one or more intermediate strikes 1014 configured to interface with the latch bar 1010 after the bottom strike 1012 is released from the latch bar 1010. The intermediate strikes 1014 may be configured to stage the panel modules 108 when the solar array 100 is moved from the stowed position to the extended position.

Figure 11A:
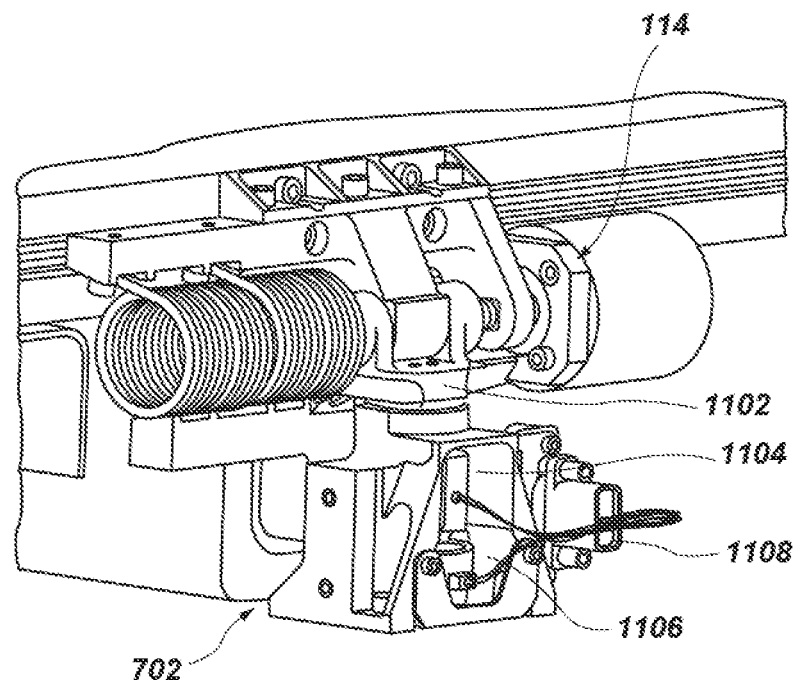
FIG. 11A illustrates a perspective view of a latch of the connection assembly of the solar array of FIGS. 1, 7, 8, and 9 in accordance with an embodiment of the present disclosure.
Figure 11B:
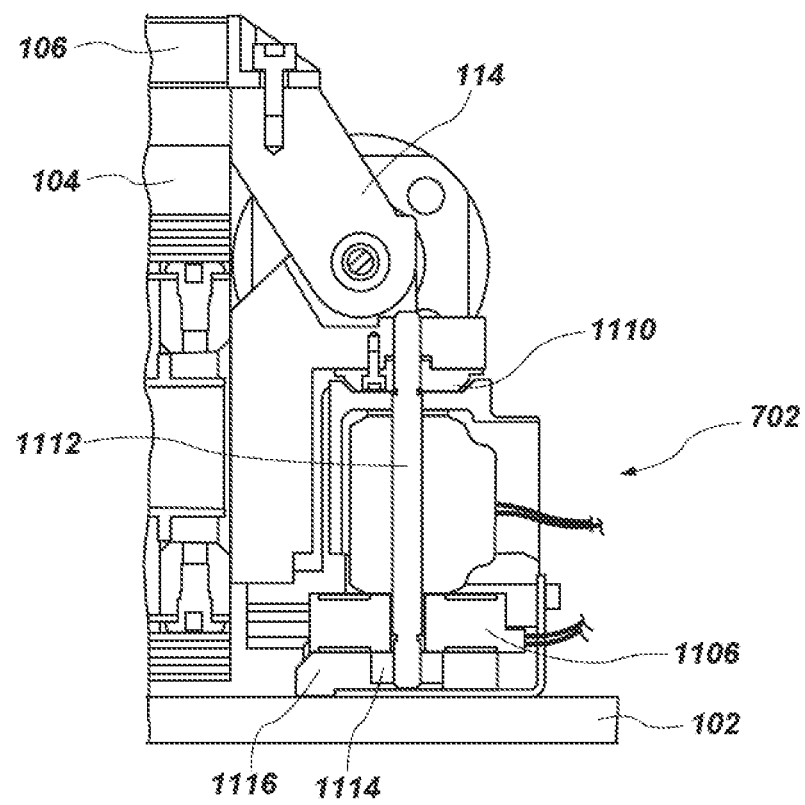
FIG. 11B illustrates a cross-sectional view of the latch illustrated in FIG. 11A in accordance with an embodiment of the present disclosure.
Figure 11C:
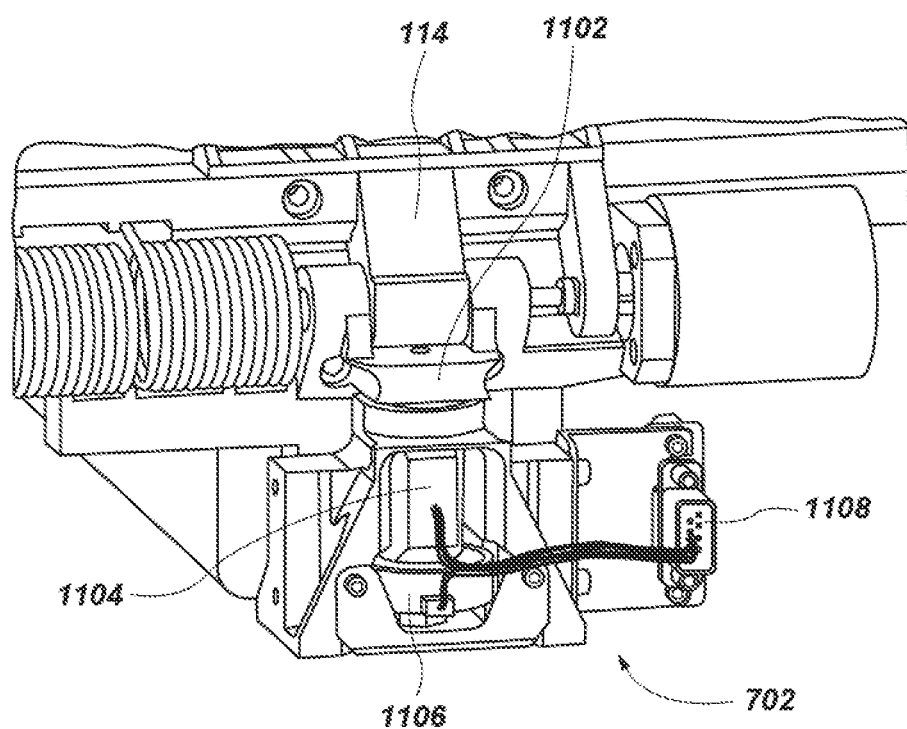
FIG. 11C illustrates a perspective view of the latch illustrated in FIGS. 11A and 11B in accordance with an embodiment of the present disclosure.

FIGS. 11A through 11C illustrate views of the top latch 702. The top latch 702 may be configured to interface with the top hinge 114. For example, the top latch 702 may be configured to latch to the top composite panel 106 through the connection between the top composite panel 106 and the top hinge 114. The top hinge 114 may include a latching interface 1102 configured to receive a latching component associated with the top latch 702 and to rest against the top latch 702.

The latching component may be a fracture bolt 1112. The fracture bolt 1112 may be threaded into the latching interface 1102 of the top hinge 114. The top latch 702 may include a release mechanism 1104 configured to fracture the fracture bolt 1112 releasing the top hinge 114 from the top latch 702. The release mechanism 1104 may be a solenoid or other electronic component, such as a FRANGIBOLT® actuator, configured to increase a tensile force on the fracture bolt 1112 to beyond the fracture limit of the fracture bolt 1112 on an electrical signal.

The top latch 702 may also include a latching mechanism 1106 configured to latch the fracture bolt 1112 within the top latch 702. For example, the fracture bolt 1112 may include a head 1114 configured to interface with the latching mechanism 1106. In some embodiments, the head 1114 may be a fitting threaded onto the fracture bolt 1112, such as a nut, wingnut, or other threaded component. In other embodiments, the head 1114 may be formed into the fracture bolt 1112, such as the head of a bolt. The latching mechanism 1106 may secure the top hinge 114 to the top latch 702 through the fracture bolt 1112. The fracture bolt 1112 may be secured to the top hinge 114 through the threaded connection between the fracture bolt 1112 and the latching interface 1102 of the top hinge 114. The fracture bolt 1112 may also be secured to the latching mechanism 1106 through the interface between the head 1114 of the fracture bolt 1112 and the latching mechanism 1106. Thus, until the fracture bolt 1112 is broken by the release mechanism 1104, the fracture bolt 1112 may secure the top hinge 114 to the latching mechanism 1106 of the top latch 702.

The top latch 702 and the top hinge 114 may include complementary geometry configured to locate the top hinge 114 relative to the top latch 702. For example, the top latch 702 may include a mating surface 1110. The mating surface 1110 may include a recess, such as a frustoconical recess, configured to locate the top hinge 114 relative to the top latch 702. In some embodiments, the mating surface 1110 may be configured to align the fracture bolt 1112 in the release mechanism 1104, such that the tensile forces for fracturing the fracture bolt 1112 may be substantially aligned with a longitudinal axis of the fracture bolt 1112 enabling a substantially clean break of the fracture bolt 1112.

The top latch 702 may include a retainer 1116 configured to retain the broken elements of the fracture bolt 1112 after the fracture bolt 1112 is broken by the release mechanism 1104. The retainer 1116 may be a space between the latching mechanism 1106 and the body 102. The retainer 1116 may be configured to retain the head 1114 of the fracture bolt 1112 within a void defined by the retainer 1116. Retaining the broken elements of the fracture bolt 1112 may substantially prevent damage to other components of the equipment and/or damage to the solar array 100 that may be caused by allowing the broken components of the fracture bolt 1112 to freely float, fall, etc., after being broken to release the top hinge 114 from the top latch 702.

The top latch 702 may include a wiring connection 1108 configured to connect the components of the top latch 702 to a central controller. For example, the central controller may send a release signal. The release signal may be provided to the release mechanism 1104 through the wiring connection 1108. The release mechanism 1104 may then fracture the fracture bolt 1112 upon receipt of the release signal through the wiring connection 1108. In some embodiments, the top latch 702 may send signals back to the controller through the wiring connection 1108, such as status signals.

Figure 12A:
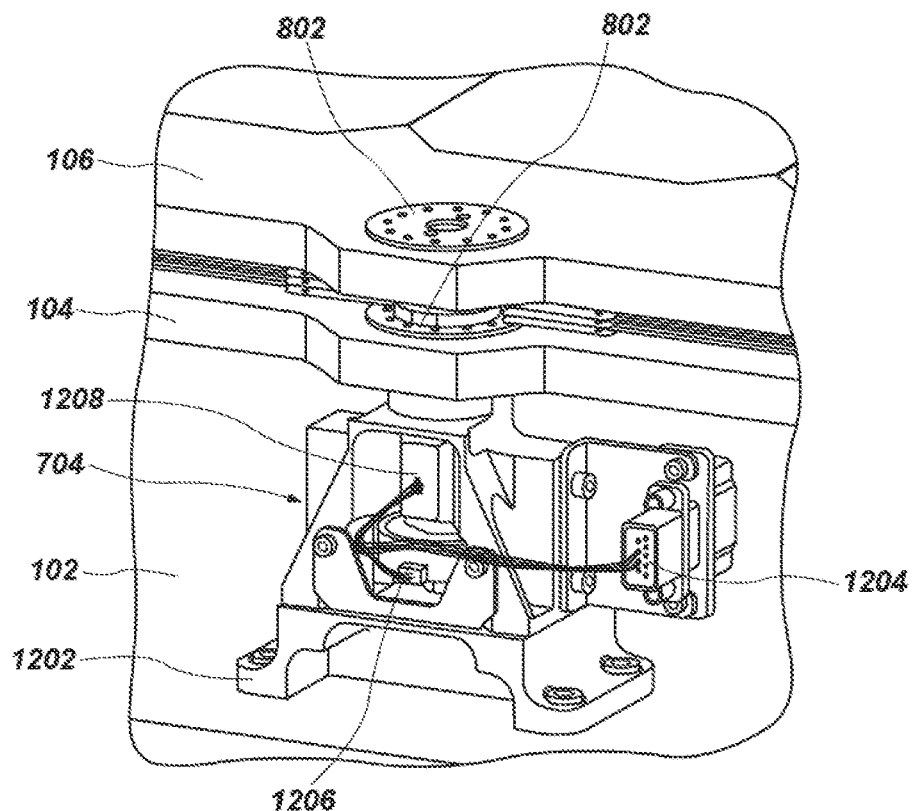
FIG. 12A illustrates a perspective view of a latch of the connection assembly of the solar array of FIGS. 1, 7, 8, and 9 in accordance with an embodiment of the present disclosure.
Figure 12B:
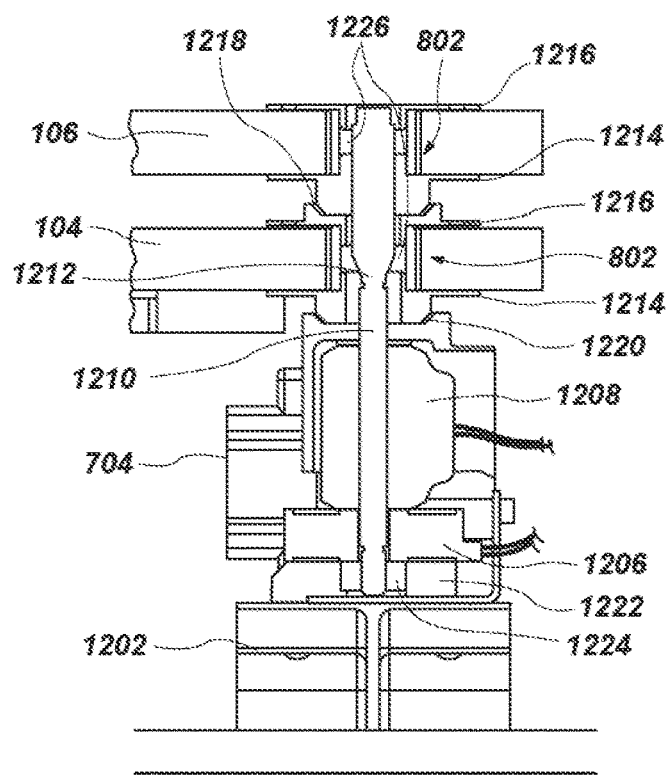
FIG. 12B illustrates a cross-sectional view of the latch illustrated in FIG. 12A in accordance with an embodiment of the present disclosure.
Figure 12C:
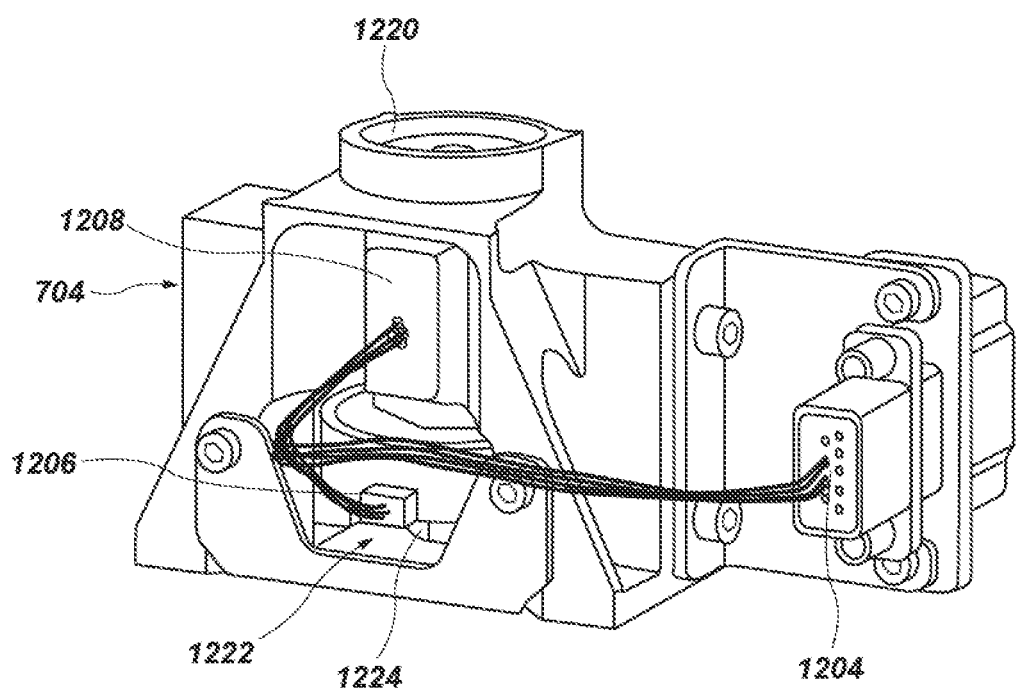
FIG. 12C illustrates a perspective view of the latch illustrated in FIGS. 12A and 12B in accordance with an embodiment of the present disclosure.

FIGS. 12A through 12C illustrate views of the side latches 704. The side latch 704 may be configured to interface with the latch receivers 802 in the base composite panel 104 and the top composite panel 106. The latch receivers 802 may include a base plate 1214 and a top plate 1216. The base plate 1214 and the top plate 1216 may be configured to sandwich the respective base composite panel 104 or top composite panel 106. The latch receiver 802 may also include an interface 1226 configured to interface with a latching component. In some embodiments, the interface 1226 may include a threaded interface. In other embodiments, the interface 1226 may include a tapered surface, such as a frustoconical surface.

The latching component may be a fracture bolt 1210. The fracture bolt 1210 may be threaded into the interface 1226 the latch receiver 802 of at least one of the base composite panel 104 or the top composite panel 106. In some embodiments, the interface 1226 of the latch receiver 802 of the top composite panel 106 may be a threaded interface and the interface 1226 of the latch receiver 802 of the base composite panel 104 may be a tapered surface. The fracture bolt 1210 may be threaded into the interface 1226 of the latch receiver 802 of the top composite panel 106. The fracture bolt 1210 may have a complementary taper configured to interface with the tapered surface of the interface 1226 of the latch receiver 802 of the base composite panel 104. The space between the threads and the complementary taper of the fracture bolt 1210 may define a space between the base composite panel 104 and the top composite panel 106 wherein the folded panel modules 108 may reside in the stowed position. Once released the fracture bolt 1210 may remain threaded into the interface 1226 of the latch receiver 802 of the top composite panel 106 and may be slidably removed from the tapered interface 1226 of the latch receiver 802 of the base composite panel 104, such that the fracture bolt 1210 no longer forms a latching connection between the base composite panel 104 and the top composite panel 106 after the side latch 704 is released.

The side latch 704 may include a release mechanism 1208 configured to fracture the fracture bolt 1210 releasing the base composite panel 104 and the top composite panel 106 from the side latch 704. The release mechanism 1208 may be a solenoid or other electronic component, such as a FRANGIBOLT® actuator, configured to increase a tensile force on the fracture bolt 1210 to beyond the fracture limit of the fracture bolt 1210 responsive to an electrical signal. In some embodiments, the fracture bolt 1210 may include a fracture point 1212 (e.g., a weak point) defined in an area of the fracture bolt 1210. The fracture point 1212 may be configured to create stress concentrations in a specific part of the fracture bolt 1210, such that the fracture bolt 1210 may break at the fracture point 1212 when the release mechanism 1208 breaks the fracture bolt 1210. The fracture point 1212 may be defined in the fracture bolt 1210 at a point below or within the latch receivers 802 in the base composite panel 104.

The side latch 704 may also include a latching mechanism 1206 configured to latch the fracture bolt 1210 within the side latch 704. For example, the fracture bolt 1210 may include a head 1224 configured to interface with the latching mechanism 1206. In some embodiments, the head 1224 may be a fitting threaded onto the fracture bolt 1210, such as a nut, wingnut, or other threaded component. In other embodiments, the head 1224 may be formed into the fracture bolt 1210 such as the head of a bolt. The latching mechanism 1206 may secure the base composite panel 104 and the top composite panel 106 to the side latch 704 through the fracture bolt 1210. The fracture bolt 1210 may be secured to the latch receivers 802 in at least one of the base composite panel 104 and the top composite panel 106 through the threaded connection between the fracture bolt 1210 and the latch receivers 802 of the base composite panel 104 and/or the top composite panel 106. The fracture bolt 1210 may also be secured to the latching mechanism 1206 through the interface between the head 1224 of the fracture bolt 1210 and the latching mechanism 1206. Thus, until the fracture bolt 1210 is broken by the release mechanism 1208, the fracture bolt 1210 may secure the latch receivers 802 of the base composite panel 104 and/or the top composite panel 106 to the latching mechanism 1206 of the side latch 704.

The side latch 704 and the latch receiver 802 of the base composite panel 104 may include complementary geometry configured to locate the latch receiver 802 of the base composite panel 104 relative to the side latch 704. For example, the side latch 704 may include a mating surface 1220. The mating surface 1220 may include a recess, such as a frustoconical recess, configured to locate the latch receiver 802 of the base composite panel 104 relative to the side latch 704. In some embodiments, the mating surface 1220 may be configured to align the fracture bolt 1210 in the release mechanism 1208, such that the tensile forces for fracturing the fracture bolt 1210 may be substantially aligned with a longitudinal axis of the fracture bolt 1210 enabling a substantially clean break of the fracture bolt 1210.

The latch receiver 802 of the base composite panel 104 and the latch receiver 802 of the top composite panel 106 may include an intermediate interface 1218 similar to the mating surface 1220. The intermediate interface 1218 may be configured to locate the top composite panel 106 relative to the base composite panel 104. For example, the intermediate interface 1218 may include a recess, such as a frustoconical recess configured to locate the latch receiver 802 of the top composite panel 106 relative to the latch receiver 802 of the base composite panel 104.

The side latch 704 may include a retainer 1222 configured to retain the broken elements of the fracture bolt 1210 after the fracture bolt 1210 is broken by the release mechanism 1208. The retainer 1222 may be a void defined within the side latch 704 in an area between the latching mechanism 1206 and the body 102. The retainer 1222 may be configured to retain the head 1224 of the fracture bolt 1210 within the void defined by the retainer 1222. Retaining the broken elements of the fracture bolt 1210 may substantially prevent damage to other components of the equipment and/or damage to the solar array 100 that may be caused by allowing the broken components of the fracture bolt 1210 to freely float, fall, etc., after being broken to release the base composite panel 104 and the top composite panel 106 from the side latch 704.

The side latch 704 may include a wiring connection 1204 configured to connect the components of the side latch 704 to a central controller. For example, the central controller may send a release signal. The release signal may be provided to the release mechanism 1208 through the wiring connection 1204. The release mechanism 1208 may then fracture the fracture bolt 1210 upon receipt of the release signal through the wiring connection 1204. In some embodiments, the side latch 704 may send signals back to the controller through the wiring connection 1204, such as status signals.

The side latch 704 may include a base 1202 configured to mount the side latch 704 to the body 102. The base 1202 may be configured to space the side latch 704 from the body 102 to position the base composite panel 104 and the top composite panel 106 relative to the body 102. For example, the base 1202 may be configured to position the base composite panel 104 and the top composite panel 106 such that the base composite panel 104 and the top composite panel 106 are at substantially the same level as defined by the top latch 702 and the root hinge 116 connections between the body 102 and the solar array 100.

Figure 13:
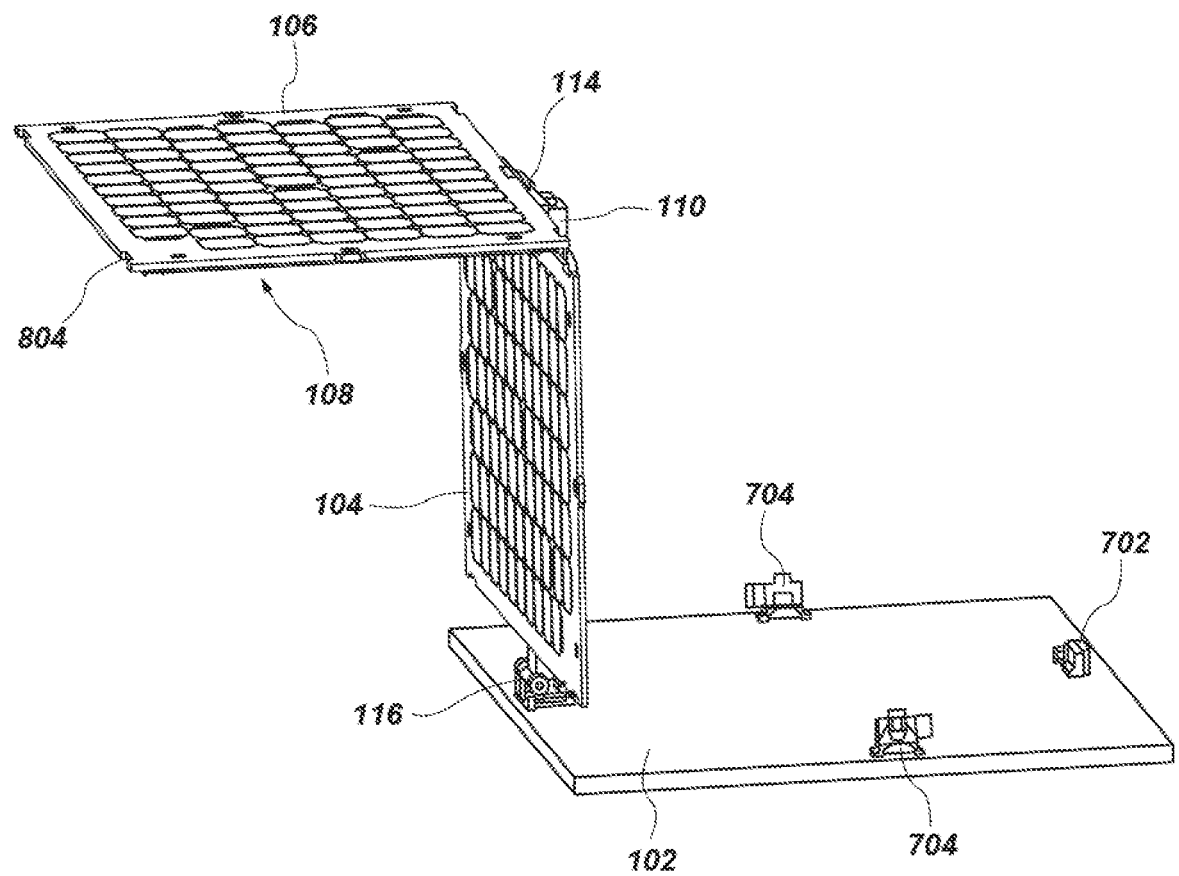
FIG. 13 illustrates a perspective view of the solar array of FIGS. 1, 7, 8, and 9 during an extension process step in accordance with an embodiment of the present disclosure.
Figure 14:
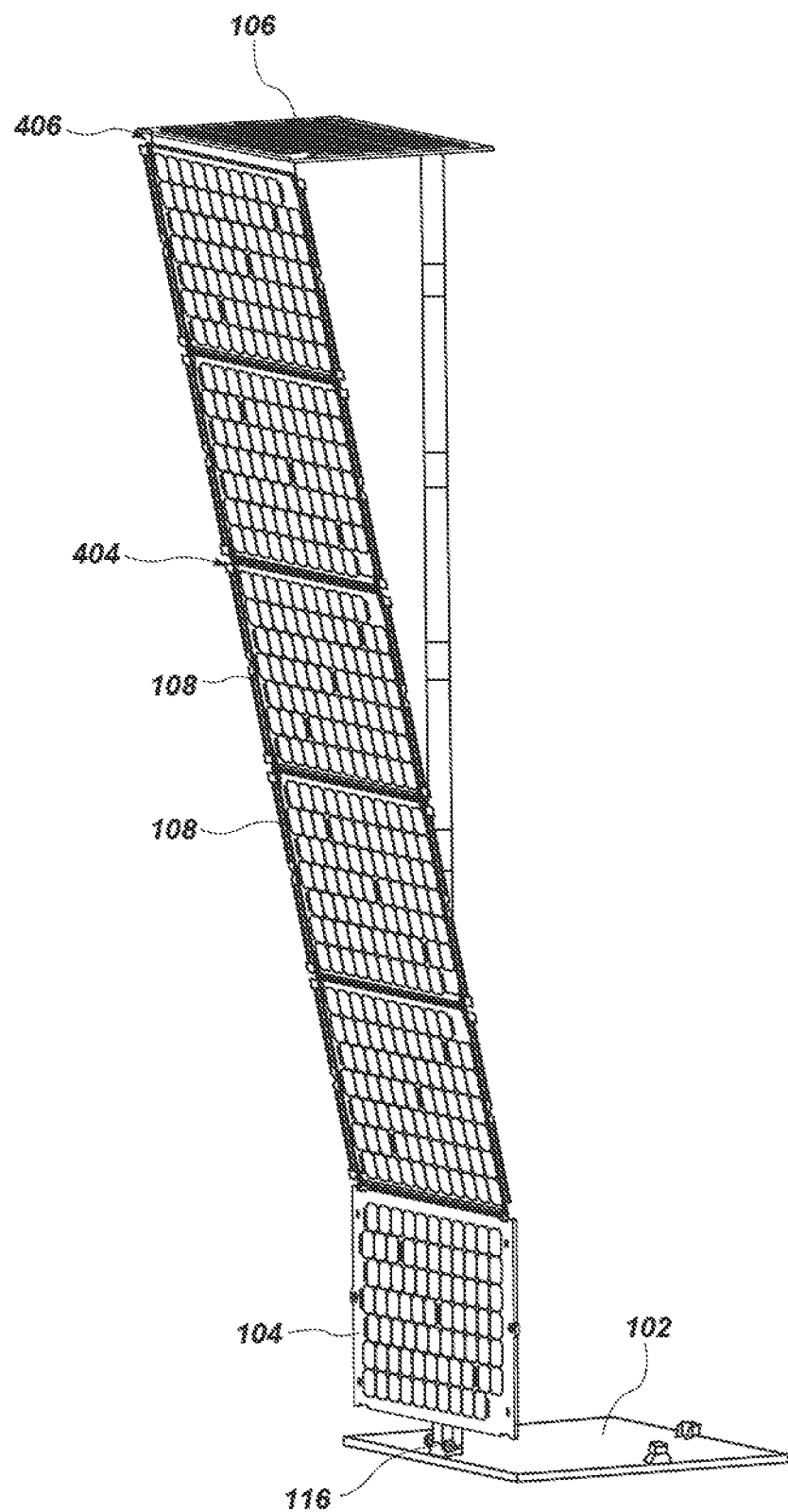
FIG. 14 illustrates a perspective view of the solar array of FIG. 13 during an extension process step in accordance with an embodiment of the present disclosure.
Figure 15:
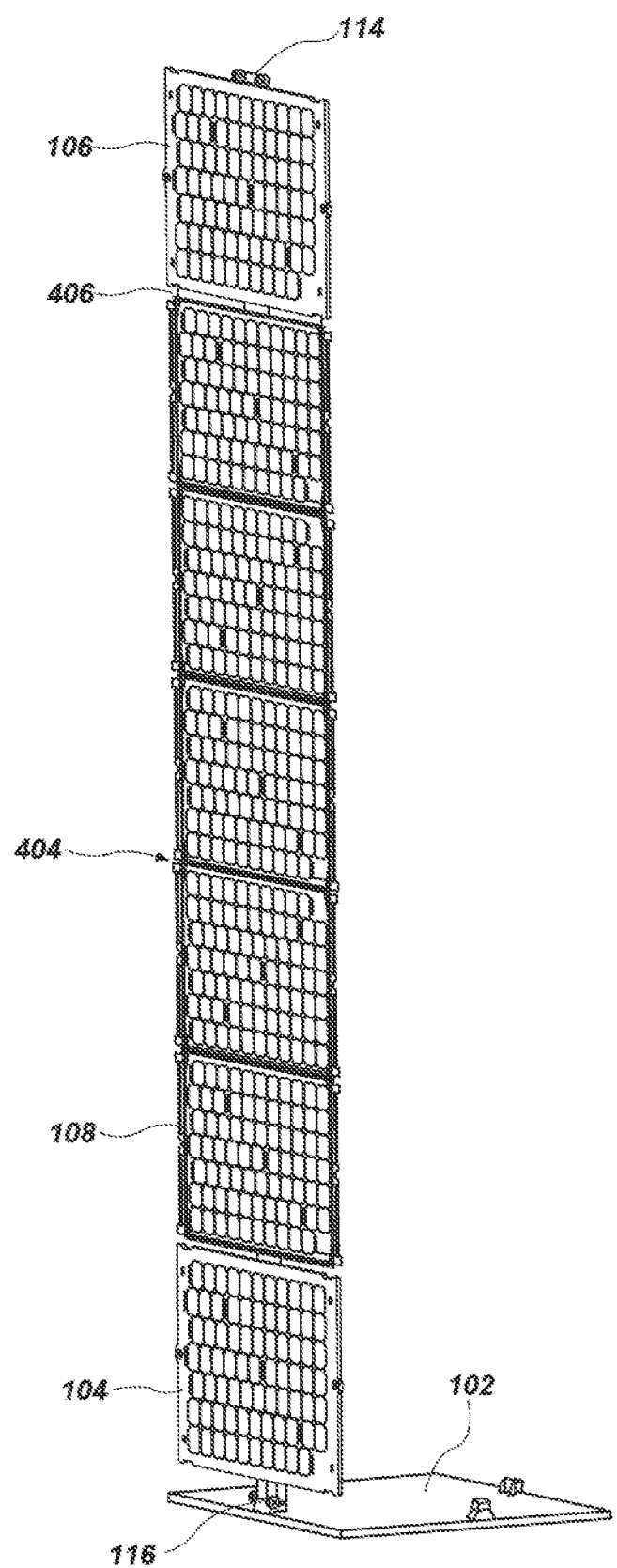
FIG. 15 illustrates a perspective view of the solar array of FIGS. 13 and 14 in a fully extended position in accordance with an embodiment of the present disclosure.

FIGS. 13, 14, and 15 illustrate acts of extending the solar array 100 from the stowed position described above to an extended position. FIG. 13 illustrates the solar array 100 after a first extension movement. The first extension movement may occur after the side latches 704 and the top latch 702 release the solar array 100 from the stowed position in the manner described above. The base composite panel 104 may rotate about the root hinge 116 relative to the body 102 until the base composite panel 104 is substantially perpendicular to the body 102 (e.g., extending away from the body 102 at about a 90° angle). The mast 110 may be coupled to both the root hinge 116 and the base composite panel 104. For example, the base composite panel 104 may be coupled to the root hinge 116 through the mast 110. Thus, the mast 110 may also rotate about the root hinge 116 relative to the body 102 until the mast 110 extends away from the body 102 at about a 90° angle. In some embodiments, the root hinge 116 may include a biasing element, such as a spring, configured to bias the mast 110 toward the perpendicular extended position.

The top hinge 114 coupled between the mast 110 and the top composite panel 106 may cause the top composite panel 106 to extend at about a 90° angle to the base composite panel 104, such that the top composite panel 106 is substantially parallel to the body 102 and spaced a distance from the body 102 defined by the base composite panel 104. The panel modules 108 may be retained on the bottom surface of the top composite panel 106 by the connection assemblies 804. As described above, the connection assemblies 804 may include a panel module clip 1008 configured to secure the panel modules 108 to the top composite panel 106 with the latch bar 1010 and the bottom strike 1012 and/or the intermediate strikes 1014. Therefore, the panel modules 108 may be substantially parallel to the body 102 and spaced a distance from the body 102 defined by the base composite panel 104.

FIG. 14 illustrates the solar array 100 during a second extension movement. The second extension movement may include extending the mast 110. As described below with respect to FIG. 18, the mast 110 may be a telescoping shaft including multiple nested segments. As the mast 110 extends away from the body 102, the top hinge 114 connecting the top composite panel 106 to the mast 110 may cause the top composite panel 106 to move away from the body 102 and the base composite panel 104.

As the top composite panel 106 moves away from the base composite panel 104, the panel modules 108 may unfold from beneath the top composite panel 106. For example, the panel module clip 1008 may release the bottom strike 1012 and the intermediate strikes 1014 as the panel modules 108 align below the top composite panel 106. The panel modules 108 may align with one another (e.g., be arranged in a substantially straight line) by rotating about the hinges 404 between the respective panel modules 108. The panel modules 108 may all align with one another to form a flexible array of panel modules 108, such as a solar blanket. The panel modules 108 may be tied together by the hinges 404. In some embodiments, the cables 406 may pass through the hinges 404 tying the panel modules 108 together as well. The cables 406 may be coupled to the base composite panel 104 and the top composite panel 106, such that the base composite panel 104 may be coupled to the top composite panel 106 through the cables 406 and/or the array of panel modules 108.

As illustrated in FIG. 14, the top composite panel 106 may be maintained in a position substantially perpendicular to the base composite panel 104 by the top hinge 114. Thus as the panel modules 108 unfold from beneath the top composite panel 106, the panel modules 108 may align at an angle relative to the base composite panel 104.

FIG. 15 illustrates the solar array 100 fully extended after the second extension movement. The mast 110 may continue to extend until all of the panel modules 108 are unfolded and aligned. Once the panel module 108 are all unfolded and aligned the top composite panel 106 may pivot about the top hinge 114 to align with the base composite panel 104. The mast 110 may then continue to extend until the entire solar array 100 is aligned with the base composite panel 104. The top composite panel 106 and the base composite panel 104 may be coupled to the mast 110 as described above. The solar array 100 may be coupled to the body 102 through the mast 110, such as through the root hinge 116 connection between the body 102 and the mast 110. Tension in the cables 406 may pull the panel modules 108 into alignment with the base composite panel 104 and the top composite panel 106. The tension in the cables 406 may also absorb loads, such as shocks, impacts, etc., protecting the solar cells 302 of the panel modules 108 from such loads.

The length of the extended solar array 100 may be substantially determined by the number of panel modules 108 included between the base composite panel 104 and the top composite panel 106. In some example embodiments, the solar array 100 may include between about 1 panel module 108 and about 13 panel modules 108 between the base composite panel 104 and the top composite panel 106, such as between about 3 panel modules 108 and about 13 panel modules 108, or between about 5 panel modules 108 and about 9 panel modules 108.

Figure 16A:
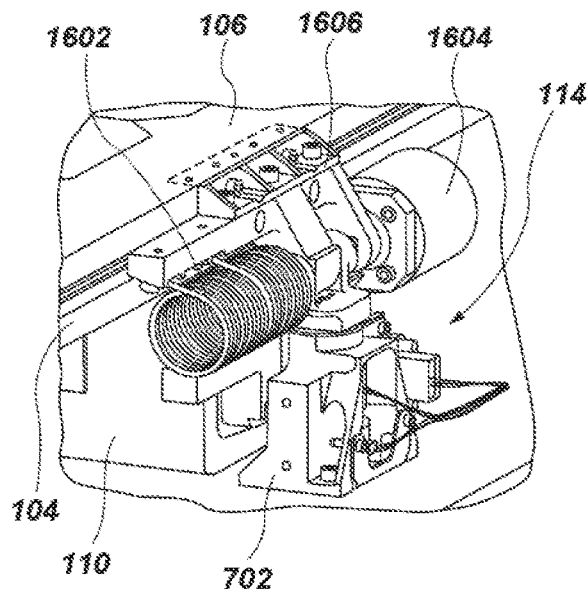
FIG. 16A illustrates a perspective view of a top hinge of the solar array of FIGS. 1, 7, 8, and 9 in the stowed position in accordance with an embodiment of the present disclosure.

FIGS. 16A through 16D illustrate enlarged views of the top hinge 114 through the different positions of the solar array 100 described above. FIG. 16A illustrates the top hinge 114 when the solar array 100 is in the stowed position. The top hinge 114 may include a mounting flange 1606 configured to secure the top hinge 114 to the top composite panel 106. The top hinge 114 may be configured to couple the mast 110 to the top composite panel 106 through the mounting flange 1606.

The top hinge 114 may include one or more biasing elements 1602, such as springs, torsion springs, spring clips, etc. The biasing elements 1602 may be operatively coupled between the mast 110 and the top composite panel 106. For example, the biasing elements 1602 may be coupled to the mast 110 and the mounting flange 1606. The biasing elements 1602 may be configured to bias the top composite panel 106 away from the mast 110. For example, in the stowed position, the biasing elements 1602 may be exerting a force on the top composite panel 106 away from the mast 110 and the base composite panel 104.

As described above the top latch 702 may be configured to interface with the top hinge 114 to secure the solar array 100 in the stowed position in conjunction with the side latches 704. The side latches 704 and the top latch 702 may be configured to oppose the force exerted on the top composite panel 106 by the biasing element 1602 when in the stowed position.

Figure 16B:
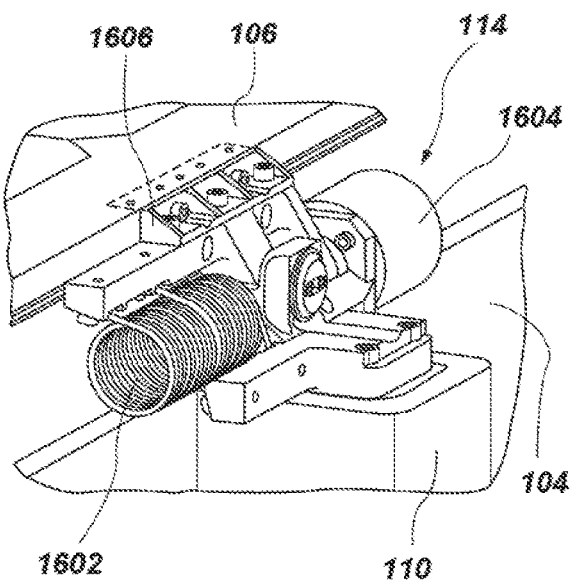
FIG. 16B illustrates a perspective view of the top hinge of FIG. 16A during the extension process step illustrated in FIG. 13 in accordance with an embodiment of the present disclosure.

FIG. 16B illustrates the top hinge 114 after the top latch 702 and the side latches 704 are released. The biasing elements 1602 may cause the top composite panel 106 to move to a position substantially perpendicular to the base composite panel 104. For example, the top hinge 114 may include a stop or detent configured to prevent the top composite panel 106 from rotating more than about 90° relative to the base composite panel 104.

The top hinge 114 may include a damper 1604 configured to control the motion of the top composite panel 106 under the force of the biasing elements 1602. For example, the damper 1604 may be configured to provide resistance to the biasing elements 1602, such that the rotation of the top composite panel 106 about the top hinge 114 may be slowed under the force of the biasing elements 1602. Slowing the motion of the top composite panel 106 may reduce forces due to impact and shock in the top composite panel 106 when the top hinge 114 contacts the stop or detent.

Figure 16C:
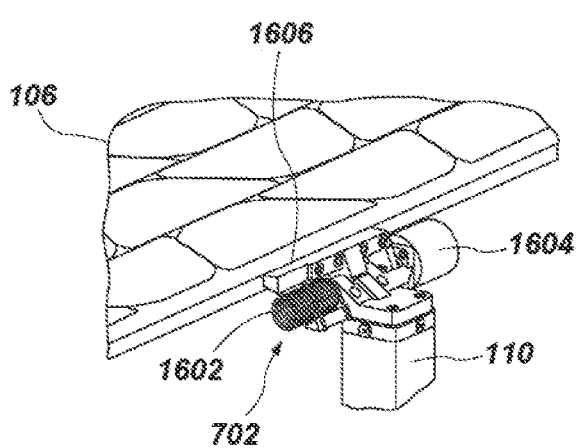
FIG. 16C illustrates a perspective view of the top hinge of FIGS. 16A and 16B during the extension process step illustrated in FIG. 14 in accordance with an embodiment of the present disclosure.
Figure 16D:
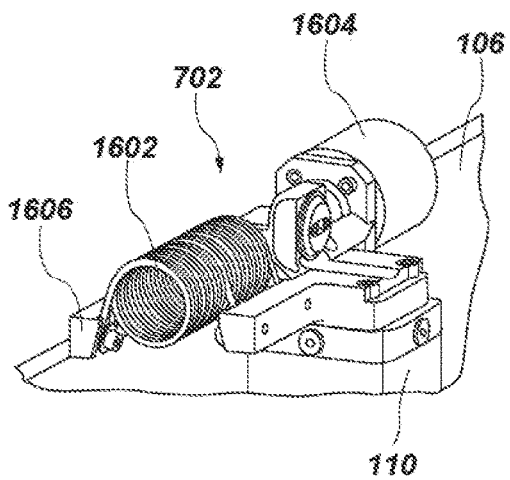
FIG. 16D illustrates a perspective view of the top hinge of FIGS. 16A, 16B, and 16C in the fully extended position illustrated in FIG. 15 in accordance with an embodiment of the present disclosure.

FIG. 16C illustrates the top hinge 114 in the position illustrated in FIG. 14 during the second movement. The biasing elements 1602 may maintain the position of the top composite panel 106 relative to the end of the mast 110. Thus, due to the biasing elements 1602 acting on the top composite panel 106, the top composite panel 106 may be maintained at about a 90° angle relative to the mast 110 and the base composite panel 104 as the mast 110 extends. The biasing elements 1602 may continue to maintain the relative position between the mast 110 and the top composite panel 106 until the panel modules 108 are all unfolded and aligned such that the cables 406 begin to have tension therein. As the tension builds in the cables 406 the tension may begin to overpower the biasing elements 1602 reducing the angle between the top composite panel 106 and the mast 110 until the top composite panel 106 is substantially aligned with the mast 110 as illustrated in FIG. 16D.

Figure 17A:
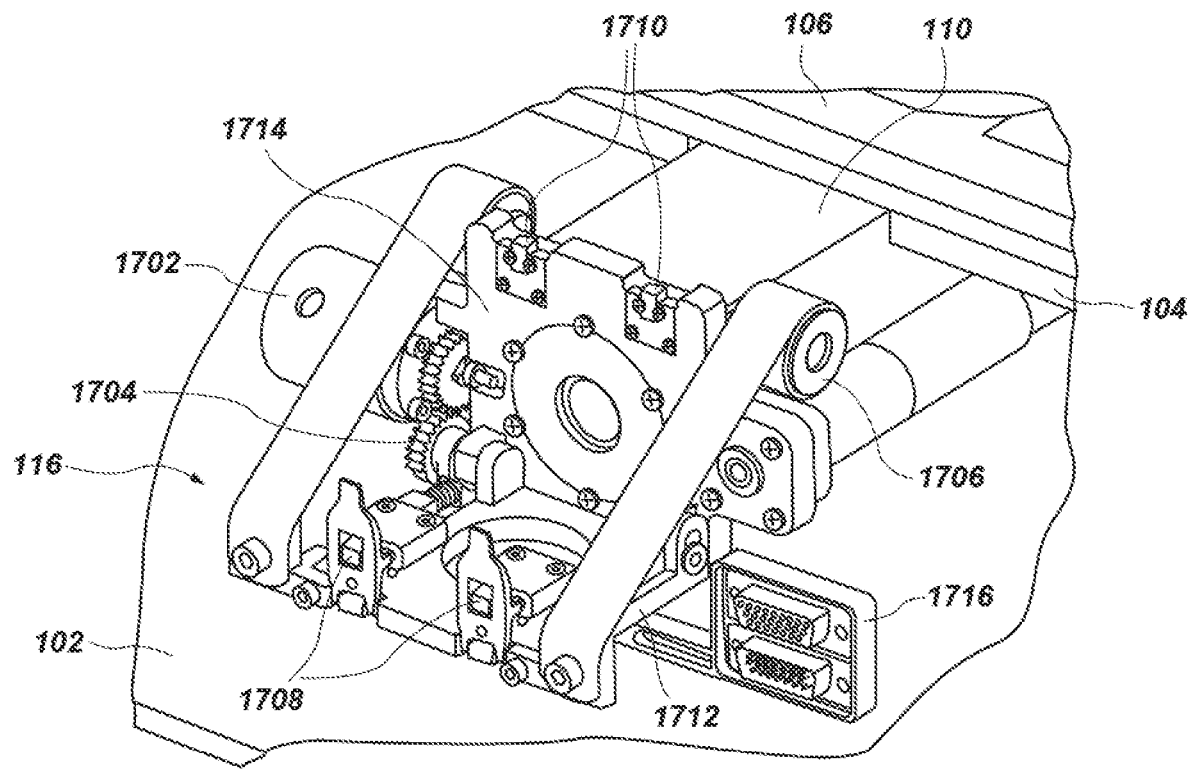
FIG. 17A illustrates a perspective view of a bottom hinge of the solar array of FIGS. 1, 7, 8, and 9 in the stowed position in accordance with an embodiment of the present disclosure.

FIG. 17A illustrates the root hinge 116 in the stowed position. The root hinge 116 may be coupled between the body 102 and the mast 110. A base plate 1712 may be coupled to the body 102 and a bottom plate 1714 may be coupled to the mast 110. The root hinge 116 may include biasing elements 1706 configured to bias the root hinge 116 to the extended position. In some embodiments, the biasing elements 1706 may be a spring, such as a constant force spring (e.g., clock spring). A constant force spring may be a roll of pre-stressed strip that exerts a nearly constant force to resist uncoiling. In the stowed position a substantial length of the constant force spring may be unwound from the biasing elements 1706, such that the constant force spring may be exerting a constant force to re-coil the unwound portion of the constant force spring.

The root hinge 116 may also include a damper 1702 configured to resist motion of the root hinge 116, such that movement of the root hinge 116 may be slowed to substantially prevent impact and shock stresses from damaging the solar array 100. The damper 1702 may be operatively coupled to the root hinge 116 through offset gears 1704. The offset gears 1704 may reduce the profile of the root hinge 116. For example, the offset gears 1704 may allow the damper 1702 to be placed in a more advantageous position. In some embodiments, the offset gears 1704 may be configured as a force multiplier, such that a smaller damper 1702 may be used to generate a similar resistance.

The base plate 1712 may include an electrical connection 1716 configured to provide an electrical connection between the solar array 100 and the body 102 of the spacecraft. The electrical connection 1716 may be operatively coupled to the wiring 408 through the base plate 1712. For example, the wiring 408 may enter the base plate 1712 and be coupled to an electrical connection within the base plate 1712. The electrical connection 1716 within the base plate 1712 may be configured to be received by a complementary electrical connection in the body 102 of the space craft, such that the wiring 408 may be electrically coupled to the spacecraft through the connection between the base plate 1712 and the body 102. The electrical connection 1716 may be a connector, such as a multi-pin connector, configured to secure multiple electrical connections between the root hinge 116 and the body 102. For example, the electrical connection may enable power generated by the solar array 100 to pass from the solar array 100 to the spacecraft. The electrical connection may further enable signals and data, such as control signals, sensor data, control data, etc., to pass between the spacecraft and the solar array 100. In some embodiments, the electrical connection 1716 may be a latching connector, such as a female connector and/or male connector including latching features, such as clips, detents, screws, threaded apertures, etc., configured to secure the electrical connection 1716 substantially preventing the electrical connection from separating under vibration and movement of the root hinge 116 and the body 102.

The base plate 1712 may include one or more latches 1708. The bottom plate 1714 may include strikes 1710 configured to interface with the one or more latches 1708. The latches 1708 and the strikes 1710 may include complementary features configured to latch the bottom plate 1714 to the base plate 1712 once the biasing elements 1706 move the root hinge 116 into the extending position.

Figure 17B:
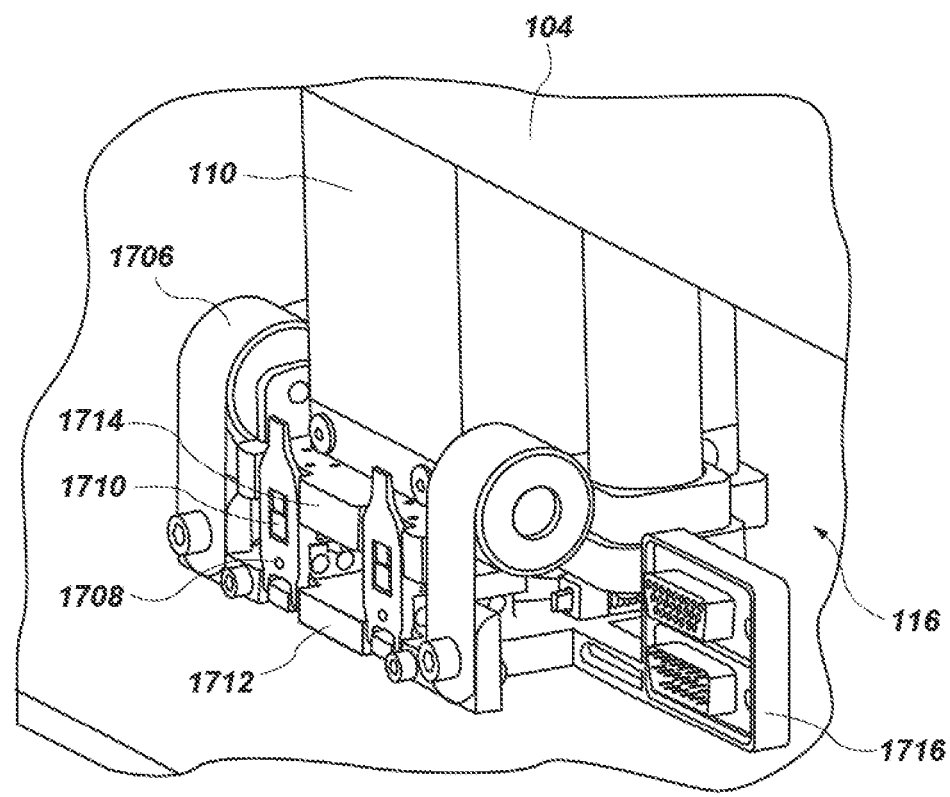
FIG. 17B illustrates a perspective view of the bottom hinge of FIG. 17A in one or more of the process steps illustrated in FIGS. 13, 14, and 15 in accordance with an embodiment of the present disclosure.

FIG. 17B illustrates the root hinge 116 in the extending position. The root hinge 116 may be in the extending position after the first movement and throughout the second movement as illustrated in FIGS. 13 through 15. In the extending position the strikes 1710 may be secured in the latches 1708 securing the bottom plate 1714 in a position adjacent and parallel to the base plate 1712.

Figure 19:
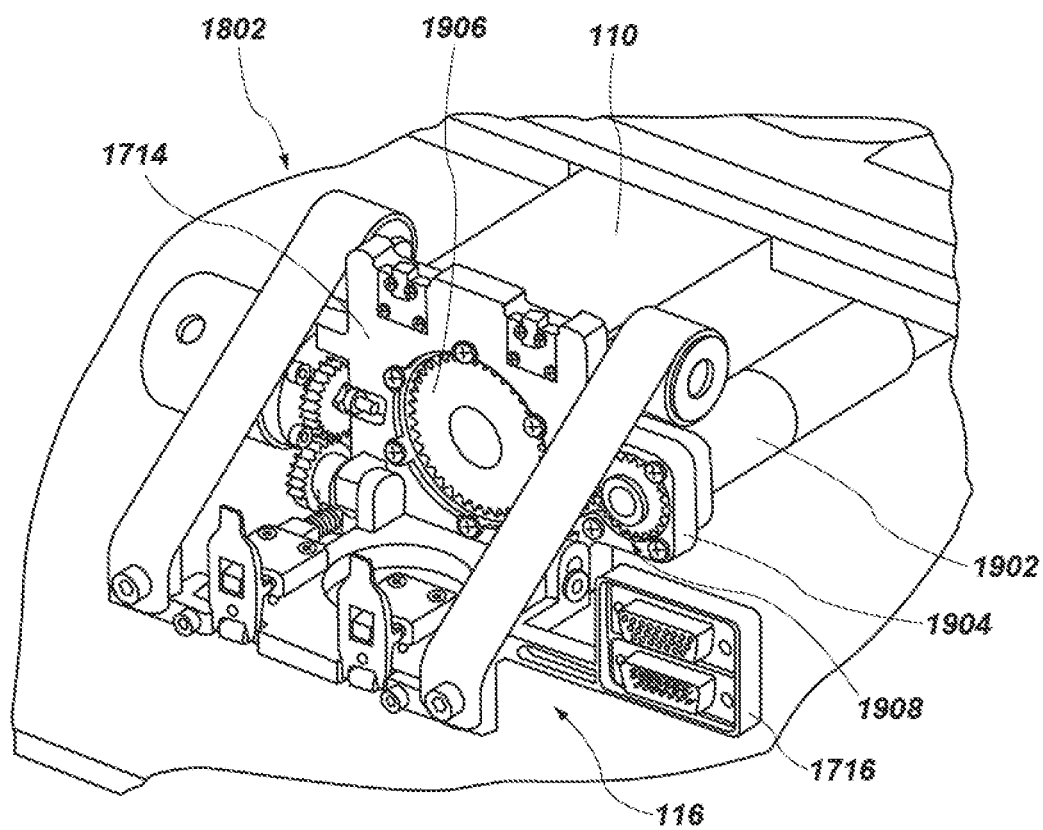
FIG. 19 illustrates a perspective view of a drive mechanism of the extendable mast of FIG. 18 in accordance with an embodiment of the present disclosure.

FIGS. 18 and 19 illustrate the mast 110 assembly and related drive systems. The mast 110 may be a telescoping mast 110 configured to extend. The mast 110 may include multiple nested segments 1808 configured to extend individually telescoping as the mast 110 extends. The mast 110 may include a screw drive 1804 driven by a drive assembly 1802. The screw drive 1804 may be substantially the same length as each of the individual nested segments 1808. The screw drive 1804 may drive a drive plate 1806 the length of the screw drive 1804. The drive plate 1806 may impinge upon each of the nested segments 1808 individually starting with the smallest nested segment 1808. Once the associated nested segment 1808 is extended the drive plate 1806 may be returned to the proximal end of the mast 110 and engage the next nested segment 1808 extending each nested segment 1808 in turn until the mast 110 is fully extended or until the solar array 100 is fully extended.

The mast 110 may be constricted from composite materials configured to reduce the weight of the mast 110 while maintaining similar strength to heavier materials. For example, the segments of the mast 110 may be formed from composite materials, such as carbon fiber or fiberglass.

FIG. 19 illustrates the drive assembly 1802. The drive assembly 1802 may be included in the root hinge 116. For example, the drive assembly 1802 may be housed within the bottom plate 1714 of the root hinge 116 adjacent to the mast 110. The drive assembly 1802 may be configured to move with the bottom plate 1714. The drive assembly 1802 may receive power and/or control signals through the electrical connection 1716 in the base plate 1712. In some embodiments, the drive assembly 1802 may be configured to send signals, such as status and/or sensor signals to the body 102 through the electrical connection 1716.

The drive assembly 1802 may include a motor 1902 coupled to a gear box 1904. The gear box 1904 may be operatively coupled to a drive gear 1906. The drive gear 1906 may be operatively coupled to the screw drive 1804. The motor 1902 may be configured to rotate gears 1908 within the gear box 1904. The gears 1908 may be operatively engaged with the drive gear 1906, such that rotation of the gears 1908 may cause the drive gear 1906 to rotate. Rotating the drive gear 1906 may cause the screw drive 1804 to rotate extending the nested segments 1808 of the mast 110.

The embodiments of the present disclosure may allow the volume and weight requirements for transporting a solar array to be reduced. Equipment used in space and transmitted to space may have strict payload requirements due to volume and weight restrictions and the expense of transporting equipment to space. Reducing the volume and weight requirements of a solar array may allow larger solar arrays to be installed on the equipment, which may increase the power available to the equipment. In some embodiments, reducing the volume and weight requirements of the solar array may allow additional components or equipment to be transported. In other embodiments, reducing the volume and weight requirements of the solar array may allow the transportation vehicles carrying the equipment and solar array or arrays to be reduced in size, which may reduce the amount of fuel required and the expense of transporting the equipment.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A solar array comprising:
    a first composite solar panel comprising solar cells secured to a first substrate;
    a second composite solar panel comprising solar cells secured to a second substrate;
    at least one solar panel module comprising solar cells secured to a flexible sheet of material between corner supports; and
    a cable coupled to the first composite solar panel, the second composite solar panel and the corner supports of the at least one solar panel module along a lateral side of the solar array, and configured to apply a tensile load.

2. The solar array of claim 1, further comprising a preload assembly configured to maintain tension in the cable.

3. The solar array of claim 2, wherein the preload assembly comprises a stationary flange and a moving flange coupled together by tensioner elements.

4. The solar array of claim 3, wherein the stationary flange is secured to the first composite solar panel and the moving flange is coupled to the cable.

5. The solar array of claim 1, wherein the at least one solar panel module further comprises a wire support positioned on a lateral side of the flexible sheet of material between the corner supports.

6. The solar array of claim 5, wherein the cable is coupled to the wire support.

7. The solar array of claim 5, further comprising wiring routed to the at least one solar panel module through the wire support.

8. The solar array of claim 7, wherein the wiring comprises at least one of electrical wiring, control wiring, and transmission wiring.

9. A vehicle comprising:
    a body;
    a solar array comprising:
        a first composite solar panel comprising solar cells secured to a first substrate;
        a second composite solar panel comprising solar cells secured to a second substrate;
        at least one solar panel module comprising solar cells secured to a flexible sheet of material between corner supports; and
        a cable coupled to the corner supports of the at least one solar panel module, the first composite solar panel, and the second composite solar panel along a lateral side of the solar array, and configured to apply a tensile load; and
    a mast configured to extend from the body and coupled to the solar array.

10. The vehicle of claim 9, wherein the mast is coupled to the body through a root hinge configured to move the mast between a stowed position and an extended position.

11. The vehicle of claim 10, wherein the root hinge includes a biasing element configured to bias the mast toward the extended position.

12. The vehicle of claim 10, wherein the mast is configured to exhibit an increased length in the extended position.

13. The vehicle of claim 9, wherein the mast is coupled directly to the first composite solar panel and the second composite solar panel.

14. The vehicle of claim 9, wherein the mast is coupled to the body on a first end of the mast and the mast is coupled directly to the first composite solar panel through a top hinge positioned on a second end of the mast opposite the first end of the mast.

15. The vehicle of claim 14, wherein the second composite solar panel is directly coupled to the first end of the mast.

16. The vehicle of claim 14, wherein the mast is operatively coupled to the at least one solar panel module through the cable extending along the lateral side of the solar array.

17. A solar panel array assembly comprising:
an extendable mast including nested tubes;
a first composite solar panel coupled to a first end of the extendable mast, the first composite solar panel comprising solar cells secured to a first substrate;
a second composite solar panel coupled to a second end of the extendable mast opposite the first end of the extendable mast, the second composite solar panel comprising solar cells secured to a second substrate;
at least one solar panel module comprising solar cells secured to a flexible sheet of material between corner supports; and
a cable coupled to the corner supports of the at least one solar panel module, the first composite solar panel, and the second composite solar panel along a lateral side of the solar array, and configured to apply a tensile load.

18. The solar panel array assembly of claim 17, wherein the extendable mast includes a drive assembly configured to move the first end of the extendable mast away from the second end of the extendable mast.

19. The solar panel array assembly of claim 18, wherein the drive assembly includes a screw drive configured to move each nested tube of the nested tubes along an axis of the extendable mast moving the first end of the extendable mast away from the second end of the extendable mast.

* * * * *